(12) United States Patent
Matsubara et al.

(10) Patent No.: US 6,371,086 B1
(45) Date of Patent: Apr. 16, 2002

(54) FUEL INJECTION CONTROL APPARATUS AND METHOD OF DIRECT FUEL INJECTION-TYPE SPARK IGNITION ENGINE

(75) Inventors: Takuji Matsubara; Mamoru Yoshioka, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/944,196

(22) Filed: Sep. 4, 2001

(30) Foreign Application Priority Data

Sep. 8, 2000 (JP) ........................................ 2000-278681

(51) Int. Cl.[7] .............................................. F02M 37/04
(52) U.S. Cl. ........................ 123/500; 123/299; 123/357
(58) Field of Search ................................. 123/500, 501, 123/357, 516, 518, 519, 520, 521, 299, 300

(56) References Cited

U.S. PATENT DOCUMENTS 4,440,132 A * 4/1984 Terada et al. ............... 123/446
4,961,412 A * 10/1990 Furuyama ................... 123/520
5,680,849 A * 10/1997 Morikawa et al. .......... 123/520
5,950,603 A * 9/1999 Cook et al. ................. 123/520
5,979,419 A * 11/1999 Toyoda ....................... 123/520
6,044,831 A * 4/2000 Takagi et al. ............... 123/698
6,047,682 A * 4/2000 Fujino et al. ............... 123/458
6,062,189 A * 5/2000 Kaneko et al. ............. 123/295

FOREIGN PATENT DOCUMENTS

JP 10-331728 * 1/1998
JP 2000-027716 * 1/2000

* cited by examiner

Primary Examiner—Carl S. Miller
(74) Attorney, Agent, or Firm—Kenyon & Kenyon

(57) ABSTRACT

Fuel vapor is introduced into an intake passage of a direct fuel injection type engine by a fuel vapor purge apparatus. The intake passage is provided with an intake oxygen concentration sensor for detecting the amount of fuel vapor in intake air. An ECU corrects the amount of fuel injection from each direct fuel injection valve in accordance with the amount of fuel vapor detected, and changes the fuel injection starting timing and the fuel injection ending timing in accordance with the amount of fuel vapor.

18 Claims, 11 Drawing Sheets

FUEL INJECTION CONTROL APPARATUS AND METHOD OF DIRECT FUEL INJECTION-TYPE SPARK IGNITION ENGINE

INCORPORATION BY REFERENCE

The disclosure of Japanese Patent Application No. 2000-278681 filed on Sep. 8, 2000 including the specification, drawings and abstract is incorporated herein by reference in its entirety.

BACKGROUND OF THE INVENTION

1. Field of the Invention

The invention relates to an apparatus and a method for controlling fuel injection in an internal combustion engine and, more particularly, to a fuel injection control apparatus and a fuel injection control method for an engine having a direct fuel injection valve for injecting fuel directly into a cylinder.

2. Description of the Related Art

A widely known evaporated fuel purge apparatus prevents release of evaporated fuel (fuel vapor) from a fuel tank into the atmosphere by temporarily adsorbing fuel vapor from the tank to a canister containing activated carbon or the like and supplying (purging) fuel vapor adsorbed to the activate carbon into an engine intake passage during operation of the engine so that the fuel vapor bums in the engine.

When the purging of fuel vapor is performed, an excess amount of fuel corresponding to the amount of fuel vapor is supplied into the engine together with intake air. Therefore, if the amount of fuel injected into the engine when the purging is not performed is maintained when the purging is performed, the engine air-fuel ratio changes (decreases), so that the state of combustion in the engine may deteriorate in some cases. Therefore, according to the conventional art, when a purge is executed, the amount of fuel injected into the engine is corrected by subtracting an amount corresponding to the amount of fuel vapor supplied to the engine from the amount supplied when a purge is not executed.

An example of an engine in which the aforementioned type of reducing correction is performed is described in, for example, Japanese Patent Application Laid-Open No. 2000-27716. The engine described in this laid-open patent application is designed as a spark-ignition engine equipped with direct fuel injection valves for injecting fuel directly into the cylinders wherein, during the compression stroke of each cylinder, fuel injection is performed so that a mixture gas layer of a combustible air-fuel ratio is formed only in the vicinity of an ignition plug within the air compressed in the cylinder and containing no fuel.

According to the conventional art, the engine capable of performing the stratified charge combustion has a problem that the aforementioned purge cannot be performed during the stratified charge combustion mode. If a purge were performed to supply air containing fuel vapor into each cylinder during the stratified charge combustion mode and fuel were injected from the fuel injection valve into the fuel vapor-containing air in each cylinder during the compression stroke, the air-fuel ratio of a combustible mixture gas layer formed by the fuel injection would have a dropped air-fuel ratio. Thus, the air-fuel ratio of the combustible mixture gas layer would excessively shift to the fuel-rich side, resulting in degraded combustion. This undesired phenomenon is generally termed disturbed stratified charge combustion.

The aforementioned engine described in Japanese Patent Application Laid-Open No. 2000-27716 is designed so as to mitigate the problem of disturbed stratified charge combustion by forming swirls in each cylinder during the intake stroke and supplying fuel vapor into each cylinder through the use of swirls so that fuel vapor exists only in one of the air layer and the combustible mixture gas layer formed in each cylinder, and by correcting the amount of fuel injected in the reducing direction in accordance with the amount of fuel vapor.

However, despite the design for the localization of fuel vapor in each cylinder and the correction of reducing the amount of fuel injection in accordance with the amount of fuel vapor, the engine of the Japanese Patent Application Laid-Open No. 2000-27716 has a problem of being incapable of completely preventing disturbed stratified charge combustion.

For example, in direct fuel injection type engines, the timing of fuel injection (i.e., the fuel injection starting timing and the fuel injection ending timing) greatly affects the state of formation of a mixture gas. Therefore, the fuel injection timing is set with high precision so as to provide an optimal mixture in accordance with the amount of fuel injection, the engine revolution speed, the load, etc. Hence, if the amount of fuel injection changes, the optimal fuel injection timing changes even though the other states of engine operation, for example, the engine revolution speed, the load etc., remain unchanged. Normally, the amount of fuel injection is changed by changing the open valve duration of the fuel injection valves (injection duration). Therefore, in the engine of the aforementioned patent application as well, the fuel injection timing is changed in response to a change in the amount of fuel injection. However, normally, the fuel injection duration is controlled so that the fuel injection duration is changed by changing one of the valve opening timing of the fuel injection valves (fuel injection starting timing) and the valve closing timing of the fuel injection valves (fuel injection ending timing) while fixing the other timing. Therefore, in the aforementioned apparatus described in Japanese Patent Application Laid-Open No. 2000-27716, the fuel injection starting timing or the fuel injection ending timing is fixed even when the amount of fuel injection is reduced for correction. Thus, there is a problem of being incapable of performing fuel injection that is optimal in view of the amount of fuel injection, the engine operation state, etc.

Although the above-described problem is related to the stratified charge combustion, similar problems also occur in conjunction with an engine operation in which fuel is injected into each cylinder during the intake stroke to form a homogeneous mixture gas in the cylinder (homogeneous mixture combustion), and an engine operation in which fuel injection is performed in a divided manner during the intake stroke and during the compression stroke, and in which fuel injected during the compression stroke is stratified in a homogeneous lean mixture formed by the fuel injected during the intake stroke so that the fuel injected during the compression stroke forms a combustible mixture layer around a spark plug in each cylinder (weak stratified charge combustion). That is, similar problems occur if only one of the fuel injection starting timing and the fuel injection ending timing is changed in accordance with a change in the amount of fuel injection.

More specifically, in direct fuel injection type spark injection engines, the problem of failing to accomplish optimal combustion occurs during not only the stratified charge combustion operation but also the homogeneous mixture combustion operation and the weak stratified charge combustion operation if only the amount of fuel injection is corrected at the time of execution of a purge.

With regard to correction of the amount of fuel injection in accordance with the amount of fuel vapor as well, it is a normal practice to, during the weak stratified charge combustion operation, correct (i.e. reduce) the amount of fuel injected by the intake stroke fuel injection and the amount of fuel injected by the compression stroke fuel injection at equal rates in accordance with the amount of fuel vapor. However, since the formation of a mixture of fuel injected during the intake stroke and the formation of a mixture of fuel injected during the compression stroke are completely different, optimal mixtures cannot be formed in each cylinder if the two amounts of fuel injection are merely reduced at equal rates at the time of execution of a purge. In some cases, therefore, combustion may deteriorate.

SUMMARY OF THE INVENTION

It is an object of the invention to provide fuel injection control apparatus and method capable of controlling fuel injection so as to achieve an optimal state of combustion in accordance with operation modes (e.g., homogeneous mixture combustion, weak stratified charge combustion, stratified charge combustion, etc.) even if the purging is performed in a direct fuel injection type spark ignition engine.

A first form of the invention is a fuel injection control apparatus of a direct fuel injection type spark injection engine, including a fuel vapor purge device that supplies a fuel vapor from a fuel tank into an engine intake passage, fuel vapor detecting means for detecting an amount of the fuel vapor in an engine intake air, a direct fuel injection valve that injects fuel directly into a cylinder, and fuel injection control means for setting an amount of fuel injection from the direct fuel injection valve, a starting timing of the fuel injection and an ending timing of the fuel injection based on a state of operation of the engine. The fuel injection control apparatus further includes injection timing correcting means for changing both the starting timing and the ending timing of the fuel injection from the direct fuel injection valve of each cylinder in accordance with the amount of the fuel vapor detected by the fuel vapor detecting means.

According to the first form of the invention, the fuel vapor detecting means for detecting the amount of fuel vapor in engine intake air, so that the amount of fuel vapor in intake air can be accurately detected. The injection timing correcting means corrects the fuel injection timing so that the state of combustion in each cylinder becomes optimal, in accordance with the amount of fuel vapor detected. For example, if the amount of fuel injection (duration of fuel injection) is reduced for correction in accordance with the amount of fuel vapor, the conventional art adjusts the fuel injection duration by adjusting one of the fuel injection starting timing and the fuel injection ending timing while fixing the other timing. In this invention, however, both the fuel injection starting timing and the fuel injection ending timing are changed so that fuel injection is performed at a timing optimal with respect to the stroke (the intake stroke or the compression stroke) during which fuel injection is performed, the position of the piston, etc. More specifically, if the amount of fuel injection is to be reduced in accordance with the amount of fuel vapor, the fuel injection duration is shortened in the following manner. That is, neither the fuel injection starting timing nor the fuel injection ending timing is fixed, but both the timings are changed; for example, the fuel injection starting timing is retarded and, at the same time, the fuel injection ending timing is advanced. Therefore, the state of formation of mixture in each cylinder at the time of ignition can be optimized, and therefore the combustion in each cylinder can be optimized. Furthermore, the conventional art reduces the amount of fuel injection by the amount of fuel vapor so as to maintain a combustion air-fuel ratio regardless of the presence/absence of fuel vapor, so that the state of combustion in each cylinder becomes close to an optimal state. According to the invention, however, a more appropriate state of combustion can be achieved since the fuel injection starting timing and the fuel injection ending timing are corrected in accordance with the amount of fuel vapor. Therefore, the reduction of the amount of fuel by the amount of fuel vapor is no longer essential, and the degree of freedom in the fuel injection control increases.

In the first form of the invention, the fuel injection control means may execute fuel injection in a homogeneous combustion mode of executing the fuel injection from the fuel injection valve during an intake stroke of each cylinder so as to form a homogeneous mixture in each cylinder.

Furthermore, in the first form of the invention, the fuel injection control means may execute fuel injection in a weak stratified charge combustion mode of executing the fuel injection from the fuel injection valve during an intake stroke of each cylinder so as to form a homogeneous mixture in each cylinder, and may execute fuel injection during a compression stroke of each cylinder so as to form a mixture layer that has a low air-fuel ratio in the homogeneous mixture.

Still further, in the first form of the invention, the fuel injection control means may execute fuel injection in a stratified charge combustion mode of executing fuel injection from the fuel injection valve during a compression stroke of each cylinder so as to form a combustible mixture layer in an air in the cylinder.

Still further, in the first form of the invention, in accordance with the state of operation of the engine, the fuel injection control means may perform fuel injection by selecting one of: a homogeneous combustion mode fuel injection in which fuel injection from the fuel injection valve is performed during an intake stroke of each cylinder so as to form a homogeneous mixture in the cylinder; a weak stratified charge combustion mode fuel injection in which fuel injection from the fuel injection valve is performed during the intake stroke of each cylinder so as to form a homogeneous mixture in the cylinder, and in which fuel injection is performed during a compression stroke of each cylinder so as to form a mixture layer having a low air-fuel ratio in the homogeneous mixture; and a stratified charge combustion mode fuel injection in which fuel injection from the fuel injection valve is performed during the compression stroke of each cylinder so as to form a combustible mixture layer in an air of each cylinder.

According to the above-described forms, the correction of the fuel injection timing in accordance with the amount of fuel vapor is applied to a case where the homogeneous mixture combustion operation is performed, a case where the weak stratified charge combustion operation is performed, a case where the stratified charge combustion is performed, or a case where a suitable one of these operation modes is selected in accordance with the state of operation of the engine. That is, the fuel injection timing control is applied to any one of all the operation modes of the direct fuel injection type spark ignition engine. Therefore, it becomes possible to perform the purging of fuel vapor during any operation state of the direct fuel injection spark ignition engine. Hence, for example, even in a case where a canister-type fuel vapor purge apparatus is used, saturation of the adsorbent (e.g., activated carbon) in the canister caused by adsorption of fuel vapor is prevented, and therefore release of fuel vapor into the atmosphere is prevented.

A second form of the invention is a fuel injection control apparatus of a direct fuel injection type spark ignition engine, including a fuel vapor purge device that supplies a fuel vapor from a fuel tank into an engine intake passage, fuel vapor detecting means for detecting an amount of the fuel vapor in an engine intake air, a direct fuel injection valve that injects fuel directly into a cylinder, and fuel injection amount setting means for setting an amount of fuel injection from the direct fuel injection valve based on a state of operation of the engine. The fuel injection control apparatus further includes fuel injection control means for executing a fuel injection in which the amount of fuel injection set by the fuel injection amount setting means is injected into each cylinder in a divided manner by an intake stroke fuel injection in which fuel injection is performed during an intake stroke of each cylinder so as to form a homogeneous mixture in each cylinder, and a compression stroke fuel injection in which fuel injection is performed during a compression stroke of each cylinder so as to form a mixture layer having a low air-fuel ratio in the homogeneous mixture, and fuel injection amount correcting means for correcting an amount of fuel to be injected by the intake stroke fuel injection and an amount of fuel to be injected by the compression stroke fuel injection in accordance with the amount of the fuel vapor detected by the fuel vapor detecting means, so that an engine operation air-fuel ratio is maintained regardless of the amount of the fuel vapor, wherein the fuel injection amount correcting means reduces only the amount of fuel to be injected by the intake stroke fuel injection if the amount of the fuel vapor detected by the fuel vapor detecting means is less than the amount of fuel to be injected by the intake stroke fuel injection.

According to the second form of the invention, the fuel injection control means executes a generally-termed weak stratified charge fuel injection in which fuel injection is performed by dividing the entire amount of fuel injection for the intake stroke fuel injection and the compression stroke fuel injection, so that a combustible mixture layer is formed by the compression stroke fuel injection within the homogeneous mixture formed by the intake stroke fuel injection. Furthermore, the fuel injection amount correcting means corrects the amount of fuel injection by reducing the amount of fuel to be injected into each cylinder by an amount corresponding to the amount of fuel vapor present in engine intake air so that an engine operation air-fuel ratio is maintained regardless of the presence/absence of purged fuel vapor.

When the weak stratified charge combustion is performed, the aforementioned fuel injection amount correction is accomplished by reducing both the amount of intake stroke fuel injection and the amount of compression stroke fuel injection at equal rates so that the total of the reductions in the two amounts of fuel injection becomes equal to the amount of fuel vapor. More specifically, if the total amount of fuel injection is reduced by an amount (e.g., 10%) corresponding to the amount of fuel vapor, both the amount of intake stroke fuel injection and the amount of compression stroke fuel injection are equally reduced (by 10%) so that the total amount of fuel injection is reduced by the amount corresponding to the amount of fuel vapor.

However, the intake stroke fuel injection is performed for the purpose of forming a homogeneous mixture in each cylinder, and the compression stroke fuel injection is performed for the purpose of stratifying a relatively dense mixture in each cylinder. The fuel vapor diffuses into intake air drawn into the engine, and is supplied into each cylinder in the form of a homogeneous mixture. Therefore, if an amount of fuel vapor drawn into each cylinder in the form of a homogeneous mixture is subtracted from the amount of the compression stroke fuel injection for forming a dense mixture layer as well, the formation of a dense mixture layer may be impeded, and combustion may deteriorate in some cases. For example, if an amount of fuel vapor is subtracted from the amount of compression stroke fuel injection as well, a portion of the amount of fuel that would normally be supplied into the cylinder by the compression stroke fuel injection is replaced by an amount of fuel supplied in the form of a homogeneous mixture of fuel vapor, and therefore a fraction of the amount of fuel that should normally be stratified around the ignition plug diffuses homogeneously in the cylinder. Hence, the air-fuel ratio of a mixture layer formed by the compression stroke fuel injection shifts to a leaner air-fuel ratio, thus leading to the problem of disturbed stratified charge combustion that results in degraded combustion.

According to the invention, therefore, if any correction is to be made for the fuel vapor drawn into each cylinder in the form of a homogeneous mixture, higher priority is given to a correction made by reducing the amount of fuel injection provided by the intake stroke fuel injection for forming a homogeneous mixture. That is, in the invention, if the amount of fuel vapor drawn into the cylinder is less than the amount of fuel to be injected by the starting timing fuel injection, the correction for the amount of fuel vapor is accomplished only based on the amount of intake stroke fuel injection, and the amount of compression stroke fuel injection is not corrected. Therefore, the air-fuel ratio of homogeneous mixture that has been formed in each cylinder at the time of the compression stroke fuel injection remains the same regardless of the presence/absence of purged fuel vapor, so that disturbed stratified charge combustion will be prevented.

In the second form of the invention, the fuel injection amount correcting means may suspend the intake stroke fuel injection, and may reduce the amount of fuel to be injected by the compression stroke fuel injection, if the amount of the fuel vapor detected by the fuel vapor detecting means is greater than the amount of fuel to be injected by the intake stroke fuel injection.

Therefore, if the amount of the fuel vapor is less than the amount of fuel to be injected by the intake stroke fuel injection, the fuel injection control described above in conjunction with the second form of the invention is performed. If the amount of fuel vapor is greater than the amount of fuel to be injected by the intake stroke fuel injection, the intake stroke fuel injection is suspended, and the amount of fuel to be injected by the compression stroke fuel injection is reduced for correction so that as a whole, the amount of fuel supplied to the engine is reduced by an amount corresponding to the amount of fuel vapor. Hence, disturbance of the stratified charge combustion is minimized.

In the second form of the invention, the fuel injection amount correcting means may execute the intake stroke fuel injection by setting the amount of fuel to be injected by the intake stroke fuel injection to a predetermined amount, and may reduce the amount of fuel to be injected by the compression stroke fuel injection, if the amount of the fuel vapor detected by the fuel vapor detecting means is greater than the amount of fuel to be injected by the intake stroke fuel injection.

Therefore, if the amount of fuel vapor is less than the amount of fuel to be injected by the intake stroke fuel injection, the fuel injection control described above in conjunction with the second form of the invention is performed. If the amount of fuel vapor is greater than the amount of fuel to be injected by the intake stroke fuel injection, the intake stroke fuel injection is not suspended but is performed with a predetermined amount. The amount of fuel injection provided by the compression stroke fuel injection is reduced by the total of an amount corresponding to the amount of fuel vapor and the amount of fuel injection provided by the intake stroke fuel injection. In the weak stratified charge combustion, the fuel injected during the compression stroke forms a dense mixture layer in a lean homogeneous mixture, and flames formed by ignition in the dense mixture layer propagate to the lean homogeneous mixture. Therefore, if there is a great difference between the air-fuel ratio of the dense mixture layer and the air-fuel ratio of the homogeneous mixture, flames do not smoothly propagate from the dense mixture layer to the lean homogeneous mixture in some cases. According to the invention, even if there is a great amount of fuel vapor, the intake stroke fuel injection is not suspended, but a small amount of fuel is injected by the intake stroke fuel injection into a homogeneous mixture formed by fuel vapor, so that a mixture having a relatively low air-fuel ratio is formed in the homogeneous mixture of fuel vapor.

Therefore, the compression stroke fuel injection injects fuel into the relatively low air-fuel ratio mixture formed by the intake stroke fuel injection, so that a dense mixture layer is formed. As a result, the relatively low air-fuel ratio (intermediate air-fuel ratio) mixture formed by the intake stroke fuel injection exists between the lean homogeneous mixture formed by fuel vapor and the fuel-rich mixture layer formed by the compression stroke fuel injection. Hence, the air-fuel ratio of mixture smoothly changes from the dense mixture layer to the homogeneous mixture, so that flames smoothly propagate from the dense mixture layer to the homogeneous mixture. If in this case, the injection of a small amount of fuel during the intake stroke is performed during a latest-possible period of the intake stroke, the fuel injected by the intake stroke fuel injection does not diffuse into the homogeneous mixture, so that a mass of mixture of an intermediate air-fuel ratio can be formed in the homogeneous mixture and therefore the propagation of flames becomes smoother.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
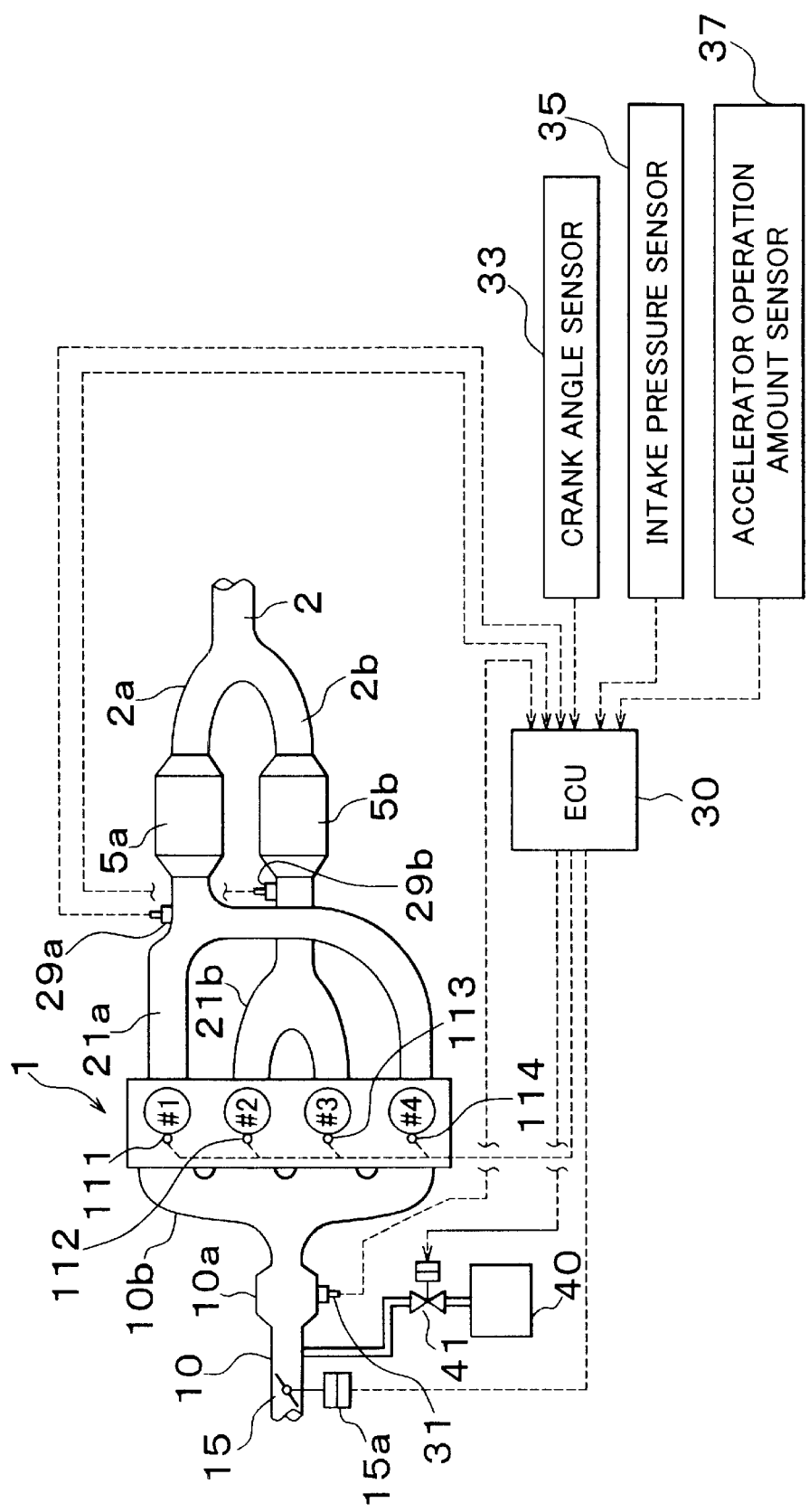
FIG. 1 is a diagram schematically illustrating an embodiment in which the invention is applied to a motor vehicle internal combustion engine.

FIG. 1 is a schematic diagram illustrating a construction of an embodiment in which the invention is applied to an internal combustion engine of a motor vehicle.

FIG. 1 shows a motor vehicle internal combustion engine 1. In this embodiment, the engine 1 is a four-cylinder gasoline engine having four cylinders #1 to #4. Each cylinder is provided with a direct fuel injection valve 111 to 114 for injecting fuel directly into the cylinder. As described below, the internal combustion engine 1 of the embodiment is capable of operating over a broad range of air-fuel ratio from an air-fuel ratio that is higher than (on the fuel-lean side of) the stoichiometric air-fuel ratio and an air-fuel ratio that is lower than (on the fuel-rich side of) the stoichiometric air-fuel ratio.

In this embodiment, the cylinders #1 to #4 are divided into two cylinder groups each of which includes two cylinders whose ignition timings are not consecutive. (For example, in the embodiment of the FIG. 1, the order of ignition of the cylinders is 1-3-4-2, and the cylinders #1 and #4 and the cylinders #2 and #3 form separate cylinder groups.) Exhaust ports of the cylinders of the two cylinder groups are connected to separate exhaust manifolds which are connected to exhaust passages that are provided separately for the two cylinder groups. FIG. 1 shows an exhaust manifold 21a that connects the exhaust ports of the cylinder group of the cylinders #1 and #4 to a dedicated exhaust passage 2a, and an exhaust manifold 21b that connects the exhaust ports of the cylinder group of the cylinders #2 and #3 to a dedicated exhaust passage 2b. In this embodiment, the separate exhaust passages 2a, 2b are provided with start catalysts (hereinafter, referred to as "SCs") 5a and 5b each of which is formed by a known three-way catalyst. The separate exhaust passages 2a, 2b join at a downstream side of the SCs into an exhaust passage 2.

FIG. 1 shows air-fuel ratio sensors 29a, 29b disposed upstream of the start catalysts 5a, 5b of the exhaust passages 2a, 2b. The air-fuel ratio sensors 29a, 29b are sensors that output voltage signals corresponding to exhaust air-fuel ratios in a board range of air-fuel ratio. The outputs of the air-fuel ratio sensors 29a, 29b are used for an air-fuel ratio control of the engine 1.

FIG. 1 further shows an intake manifold 10b that connects the intake ports of the cylinders of the engine 1 to an intake passage 10, and a surge tank 10a provided on the intake passage 10.

Furthermore, in this embodiment, a throttle valve 15 is provided in the intake passage 10. The throttle valve 15 in the embodiment is a generally-termed electronically controlled throttle valve that is driven by an appropriate actuator 15a, such as a stepping motor or the like, so as to assume a degree of opening corresponding to a control signal from an ECU 30 described below.

A known fuel vapor purge device 40 is connected via a purge control valve 41 to a portion of the intake passage 10 downstream of the throttle valve 15. The purge device 40 is equipped with a canister containing an adsorbent, for example, activated carbon or the like, so that fuel vapor from a fuel tank (not shown) of the engine 1 is adsorbed by the adsorbent disposed in the canister. Therefore, release of fuel vapor from the fuel tank into the atmosphere is prevented. The purge control valve 41 is equipped with an appropriate actuator, such as a stepping motor or the like, and assumes a degree of opening corresponding to a control signal from the ECU 30. When the purge control valve 41 is opened during operation of the engine 1, fuel vapor adsorbed within the canister of the purge device 40 flows out of the purge control valve 41 into the intake passage 10, and mixes with intake air that has passed through the throttle valve 15, thereby forming a homogeneous mixture. The mixture is then drawn into the cylinders of the engine 1.

Furthermore, in the embodiment, an oxygen concentration sensor 31 for detecting the oxygen concentration in intake air is disposed on the surge tank 10a of the intake passage 10. The oxygen concentration sensor 31 is a sensor that outputs a signal corresponding to the oxygen concentration in intake air over a wide range of concentration. The oxygen concentration sensor 31 is a type of sensor similar to the air-fuel ratio sensors 29a, 29b.

FIG. 1 shows the electronic control unit (ECU) 30 of the engine 1. The ECU 30 is a microcomputer having a known construction that includes a RAM, a ROM and a CPU in this embodiment. The ECU 30 performs basic controls of the engine 1, such as an ignition timing control, an air-fuel ratio control, etc. In this embodiment, in addition to the aforementioned basic controls, the ECU 30 performs a control of changing the mode of fuel injection from the direct injection valves 111 to 114 to change the operation air-fuel ratio of the engine in accordance with the state of operation of the engine 1, and also performs the purging of fuel vapor by controlling the opening/closing of the purge control valve 41. Furthermore, during execution of a purge, the ECU 30 performs a purge fuel injection control of detecting the amount of fuel vapor in intake air through the use of the intake oxygen concentration sensor 31 and changing the amount of fuel injected from the direct injection valves 111 to 114 of the cylinders, the fuel injection timing of each cylinder, etc. based on the detected amount of fuel vapor.

In order to perform the aforementioned various controls, input ports of the ECU 30 receive inputs of signals from the air-fuel ratio sensors 29a, 29b which indicate exhaust air-fuel ratios at the inlets of the start catalysts 5a, 5b, a signal from the intake oxygen concentration sensor 31 which indicates the oxygen concentration in intake air, and a signal from an intake pressure sensor 35 provided in the engine intake manifold which corresponds to the pressure in the intake pipe of the engine. Furthermore, input ports of the ECU 30 receive inputs of a rotational angle pulse signal that is outputted from a crank angle sensor 33 disposed near an engine crankshaft (not shown) at every predetermined rotational angle of the engine crankshaft (e.g., every 15 degrees) and that indicates the rotational angle of the crankshaft, and a reference crank position pulse signal that is outputted from the crank angle sensor 33 at every 720° engine revolution (e.g., every time the compression top dead center of the cylinder #1 is reached).

Still further, in the embodiment, an input port of the ECU 30 receives a signal that is outputted from an accelerator operation amount sensor 37 disposed near an accelerator pedal (not shown) of the engine 1 and that indicates the amount of depression of the accelerator pedal (accelerator operation amount) accomplished by an operating person. The ECU 30 performs A/D conversion of the output of the intake pressure sensor 35 and the output of the accelerator operation amount sensor 37, and stores them as an intake pipe pressure PM and an accelerator operation amount ACCP into predetermined areas in the RAM of the ECU 30. Furthermore, the ECU 30 calculates an engine revolution speed NE based on the time interval of the rotational angle pulse signals outputted from the crank angle sensor 33 at every predetermined rotational angle, and calculates a crank angle (phase) based on the number of rotational angle pulse signals that follow a reference crank position pulse signal. The ECU 30 uses the engine revolution speed NE and the crank angle for various controls.

Output ports of the ECU 30 are connected to the direct injection valves 111 to 114 of the cylinders via a fuel injection circuit (not shown) in order to control the amount of fuel injection and the fuel injection timing of each cylinder. Furthermore, an output port of the ECU 30 is connected to the actuator 15a of the throttle valve 15 via a drive circuit (not shown) for the purpose of controlling the degree of opening of the throttle valve 15.

The ECU 30 is also connected to an actuator of the purge control valve 41 via a drive circuit (not shown), and controls the degree of opening of the purge control valve 41 to perform the purging of fuel vapor.

In this embodiment, the ECU 30 operates the engine 1 in one of five modes mentioned below in accordance with the condition of operation of the engine 1.

(i) lean air-fuel ratio stratified charge combustion (a single injection during the compression stroke)
(ii) lean air-fuel ratio weak stratified charge combustion (two injections, one during the intake stroke and one during the compression stroke)
(iii) lean air-fuel ratio homogenous mixture combustion (a single injection during the intake stroke)
(iv) stoichiometric air-fuel ratio homogeneous mixture combustion (a single injection during the intake stroke)
(v) rich air-fuel ratio homogeneous mixture combustion (a single injection during the intake stroke)

In a light load operation region of the engine 1, the lean air-fuel ratio stratified charge combustion of the mode (i) is performed. Each cylinder of the engine 1 is equipped with two intake valves, that is, an intake valve with a swirl port for forming swirls (whirling streams) of intake air and an intake valve with an ordinary straight port. The amount of intake air that flows into the cylinder via the swirl port can be controlled by adjusting the degree of opening of a swirl control valve (SCV) (not shown) provided in an intake passage connected to the straight port. For the stratified charge combustion, the degree of opening of the SCV is set to a completely closed state to increase the amount of intake air flowing via the swirl port so that strong swirls are formed in the cylinder. During this mode, the direct fuel injection is performed only once during a latter half period of the compression stroke of each cylinder, so that injected fuel forms a layer of a combustible mixture in the vicinity of the ignition plug of each cylinder. Furthermore, during this operation mode, the amount of fuel injected is very small, and the air-fuel ratio in each cylinder as a whole reaches about 25 to 30, or even a higher ratio.

If the load increases from the state of the mode (i) so that a low-load operation region is reached, the lean air-fuel ratio weak stratified charge combustion of the mode (ii) is carried out. The amount of fuel injected into each cylinder is increased as the engine load increases. However, in this load region, a target amount of fuel is injected into each cylinder by injecting fuel during an earlier half period of the intake stroke in addition to the fuel injection during a latter half period of the compression stroke. The fuel injected into each cylinder during the earlier half period of the intake stroke forms a very lean homogeneous mixture by the time of ignition thereof. During the latter half period of the compression stroke, fuel is injected into the very lean homogeneous mixture so that an ignitable combustible mixture layer is formed in the vicinity of the ignition plug. At the time of ignition, the combustible mixture layer initiates combustion, and flames propagate to the surrounding lean mixture layer. Therefore, stable combustion is accomplished. During this mode, the amount of fuel supplied by injection actions performed during the intake stroke and the compression stroke is greater than the amount of fuel supplied in the mode (i). However, the air-fuel ratio as a whole is a relatively less lean air-fuel ratio (e.g., an air-fuel ratio of about 20 to about 30).

If the engine load further increases, the engine 1 carries out the lean air-fuel ratio homogeneous mixture combustion of the mode (iii). During this mode, the SCV is fully opened, so that intake air flows into each cylinder mostly via the straight port. Furthermore, during this mode, fuel injection is performed only once during an earlier half period of the intake stroke, and the amount of fuel injected is further increased from the amount of fuel injected in the mode (ii). The homogeneous mixture formed in each cylinder during this mode has a lean air-fuel ratio that is relatively close to the stoichiometric air-fuel ratio (e.g., an air-fuel ratio of about 15 to about 25).

If the engine load further increases so that a high engine load operation region is reached, the amount of fuel is further increased from the amount supplied in the mode (iii), that is, the stoichiometric air-fuel ratio homogeneous mixture combustion of the mode (iv) is carried out. During this mode, a homogeneous mixture of the stoichiometric air-fuel ratio is formed in each cylinder, and the engine output increases. If the engine load further increases so that a full-engine load operation is reached, the amount of fuel injected is further increased from the amount of fuel supplied in the mode (iv), that is, the rich air-fuel ratio homogeneous mixture combustion of the mode (v) is carried out. During this mode, the homogeneous mixture formed in each cylinder has a rich air-fuel ratio (e.g., an air-fuel ratio of about 12 to about 14).

According to the embodiment, the optimal operation modes (the modes (i) to (v)) corresponding to the accelerator operation amount (the amount of depression of the accelerator pedal accomplished by an operating person) and the engine revolution speed are pre-set based on experiments and the like. The modes are pre-stored in the ROM of the ECU 30 in the form of a numerical table (map) that employs the accelerator operation amount and the engine revolution speed. During operation of the engine 1, the ECU 30 determines which one of the modes (i) to (v) to select at present based on the accelerator operation amount detected by the accelerator operation amount sensor 37 and the engine revolution speed. In accordance with the selected mode, the ECU 30 determines quantities of control for controlling the state of operation of the engine 1, such as the amount of fuel injection, the fuel injection timing, the number of times of performing the fuel injection, the ignition timing, the degree of throttle valve opening, the EGR amount (the degree of EGR valve opening), etc.

If the mode (iv) (stoichiometric air-fuel ratio homogeneous mixture combustion) is selected, the ECU 30 executes an air-fuel ratio control of feedback-correcting the amount of fuel injection calculated as described above so that the engine exhaust air-fuel ratio reaches the stoichiometric air-fuel ratio, based on the outputs of the air-fuel ratio sensors 29*a*, 29*b*.

More specifically, if any one of the modes (i) to (iii) (lean air-fuel ratio combustion) is selected, the ECU 30 determines quantities of control, such as the amount of fuel injection, the fuel injection timing, the degree of throttle opening, the EGR amount, the ignition timing, etc., from the accelerator operation amount and the engine revolution speed with reference to a corresponding one of the numerical tables prepared beforehand individually for the modes (i) to (iii). If either one of the modes (iv) and (v) is selected, the ECU 30 sets quantities of control, such as the amount of fuel injection and the like, based on the accelerator operation amount, the engine revolution speed, and the intake pipe pressure detected by the intake pressure sensor 35, with reference to a corresponding one of the numerical table prepared beforehand individually for the modes (iv) and (v).

During any one of the mode (i) to (iii), the degree of opening of the throttle valve 15 is controlled within a range near the fully open state, in accordance with the accelerator operation amount. In this range, the degree of throttle valve opening is decreased with decreases in the accelerator operation amount. However, since this range is practically equivalent to the fully open state of the throttle valve 15, a change in the degree of throttle valve opening within the range does not substantially change the intake pipe pressure, and causes substantially no intake throttling.

In contrast, during either one of the modes (iv) and (v), the degree of throttle valve opening is controlled to a degree of opening substantially equivalent to the accelerator operation amount. That is, if the accelerator operation amount (the amount of depression of the accelerator pedal) is "0", the degree of throttle opening is also set to "0" (completely closed). If the accelerator operation amount is 100% (if the accelerator pedal is completely depressed), the degree of throttle opening is also set to 100% (fully opened).

Next described will be a fuel injection control executed at the time of fuel vapor purge in accordance with the embodiment. In the description below, the amount of fuel injection and the fuel injection timing set by the ECU 30 when the purging is not executed will be referred to as "base amount of fuel injection" and "base fuel injection timing" in order to distinguish the amount of fuel injection and the fuel injection timing set at the time execution of the purging.

The fashions of fuel injection in this embodiment can be roughly divided into the intake stroke fuel injection for forming homogeneous mixture (modes (iii), (iv), (v)), and the compression stroke fuel injection for forming stratified mixture (mode (i)), as indicated above. During the weak stratified charge combustion of the mode (ii), the two fashions of fuel injection are performed.

Firstly, conditions required for the intake stroke fuel injection and for the compression stroke fuel injection will be described.

With regard to the intake stroke fuel injection, it is necessary to form a homogeneous mixture in each cylinder by causing injected fuel to homogeneously diffuse in the cylinder. To this end, it is necessary to allow a sufficient amount of time for the diffusion of injected fuel in the cylinder. Therefore, it is preferable to complete the intake stroke fuel injection at an earliest-possible timing (i.e., a timing that is as close to the intake stroke top dead center as possible). However, if the piston is an upper position at the time of execution of fuel injection, injected fuel may deposit on the piston, thereby impeding formation of a homogeneous mixture. In that sense, it is desirable to start the intake stroke fuel injection when the piston is at a lowest-possible position (i.e., a timing that is as close to the intake stroke bottom dead center as possible).

That is, it is desirable that the intake stroke fuel injection be started as late as possible (at a timing that is as close to the bottom dead center as possible), and be ended as early as possible (at a timing that is as close to the top dead center as possible).

In reality, however, if the amount of fuel injection is relatively great, the aforementioned conditions cannot be fully met because of the lengthened fuel injection duration. Furthermore, during high-speed engine operation, the duration of the intake stroke becomes relatively short in comparison with the fuel injection duration, so that a similar problem arises even if the amount of fuel injection is small. Still further, in reality, the piston speed also greatly affects the formation of a homogeneous mixture. That is, optimal starting and ending timings of the intake stroke fuel injection are determined by the engine load (i.e., the amount of fuel injection (fuel injection duration)), the engine revolution speed, the piston speed at the time of injection, etc.

With regard to the compression stroke fuel injection for stratification, it is necessary to form a dense (rich) mixture layer around the ignition plug of each cylinder without allowing injected fuel to diffuse in the cylinder. It is also necessary that the dense mixture layer formed by injection have an air-fuel ratio within a range that allows easy ignition (e.g., an air-fuel ratio of about 13 to about 14).

In order to stratify fuel injected by the compression stroke fuel injection as a dense mixture layer, it is desirable to delay the injection starting timing as much as possible so that the injected fuel does not diffuse before being ignited. However, the compression stroke fuel injection is performed while the piston is ascending toward the top dead center during a latter period of the compression stroke. Therefore, as the ending timing of the compression stroke fuel injection is delayed, the injected fuel is more likely to be compressed due to the ascent of the piston before diffusing, so that the air-fuel ratio of the stratified mixture will decrease (shift to the rich side). Therefore, if the fuel injection timing is delayed, the stratified mixture becomes excessively dense so that ignition and combustion may fail.

Therefore, during the compression stroke fuel injection as well, optimal starting and ending timings of fuel injection vary depending on the engine load, the engine revolution speed, the piston speed at the time of injection, etc.

Thus, with regard to both the intake stroke fuel injection and the compression stroke fuel injection, optimal fuel injection timing is affected by many factors, so that it is difficult to obtain an optimal injection timing in a real engine. Therefore, in reality, the fuel injection timing is determined by a generally-termed conforming operation in which an engine is actually operated at various engine revolution speeds and various engine loads, and in which fuel injection timings are set so that the state of formation of mixture becomes as close to an ideal state as possible with combinations of operation conditions (engine revolution speed, engine load).

Therefore, in a case where the amount of fuel injection is corrected taking into account the amount of fuel supplied to each cylinder by purging fuel vapor, mere correction of the amount of fuel injection with the fuel injection starting or ending timing being fixed will degrade the mixture formation state set by the aforementioned conforming operation, and will result in a failure in accomplishing good combustion in some cases.

According to the embodiment, in order to solve the aforementioned problem, both the injection starting timing and the injection ending timing are changed if the amount of fuel injection needs to be corrected in accordance with the amount of fuel vapor.

Figure 2:
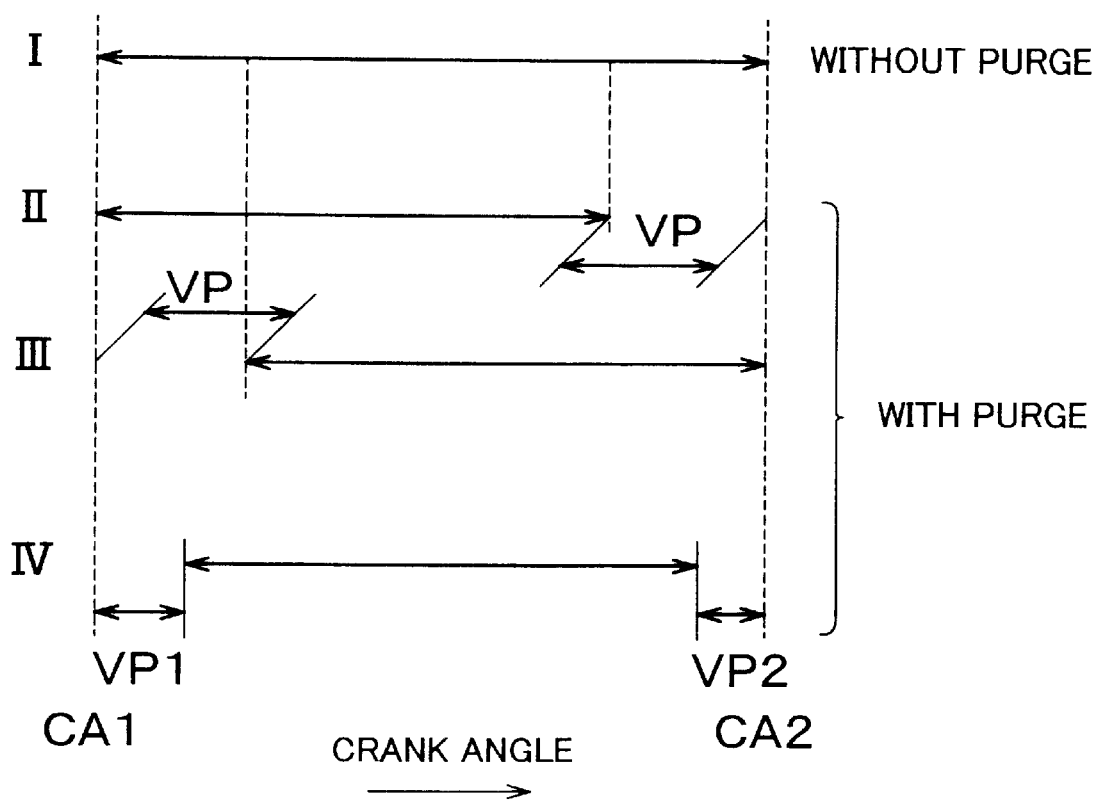
FIG. 2 is a timing chart illustrating correction of the fuel injection timing in the invention.

FIG. 2 is a diagram for illustrating a difference between the fuel injection timing correction in accordance with the embodiment and the fuel injection timing correction in accordance with the conventional art.

FIG. 2 indicates the fuel injection timing, where the horizontal axis represents the crank angle (CA). Line I in FIG. 2 indicates the fuel injection timing (base fuel injection timing) in a case where no purging is performed. That is, according to the base fuel injection timing, fuel injection is started at a crank angle of CA1, and is ended at a crank angle of CA2.

In FIG. 2, lines II and III indicate the conventional fuel injection corrections. More specifically, line II indicates fuel injection correction in which the injection starting timing is fixed, and line III indicates fuel injection correction in which the injection ending timing is fixed. That is, if a correction is to be performed so as to reduce the amount of fuel injection (injection duration) by an amount VP corresponding to the amount of fuel vapor, the injection ending timing is advanced by the amount VP according to the correction with fixed injection starting timing (II), or the injection starting timing is retarded by the amount VP according to the correction with fixed ignition ending timing (III).

In FIG. 2, line IV indicates the fuel injection correction in accordance with the embodiment. As indicated by line IV in FIG. 2, when the injection duration is to be reduced by the amount VP in the embodiment, the time VP is divided into VP1 and VP2 (VP=VP1+VP2), and the injection starting timing is retarded by VP1, and the injection ending timing is advanced by VP2. The proportion between VP1 and VP2 is set in accordance with various engine revolution speeds and various engine loads based on experiments using a real engine so that the state of formation of mixture becomes as close to an ideal state as possible. Therefore, even in a case where the amount of fuel vapor is to be corrected, the fuel injection stating timing and the fuel injection ending timing are more appropriately adjusted so as to accomplish good combustion.

The fuel injection controls at the time of execution of a purge during the homogeneous mixture combustion mode and the stratified charge combustion mode will be separately described.

(1) HOMOGENEOUS MIXTURE COMBUSTION

1) First Embodiment

This embodiment will be described in conjunction with a case where the fuel injection control is performed with the fuel injection starting timing being set as a reference timing. In this case, the ECU 30 controls the amount of fuel injection and the fuel injection timing by setting the fuel injection starting timing and the injection duration of each cylinder in accordance with the state of engine operation. According to the conventional art, if the amount of fuel injection is to be reduced in order to correct the amount of fuel vapor at the time of execution of a purge, the amount of fuel injection is qreduced by shortening the fuel injection duration without changing the fuel injection starting timing (with a fixed injection starting timing). The embodiment differs from the conventional art in that when the fuel injection duration is to be changed, the fuel injection starting timing serving as a reference timing is also corrected (retarded). Therefore, according to the embodiment, both the fuel injection starting timing and the fuel injection ending timing are adjusted in accordance with the amount of fuel vapor so as to achieve an optimal state of formation of a mixture.

Figure 3:
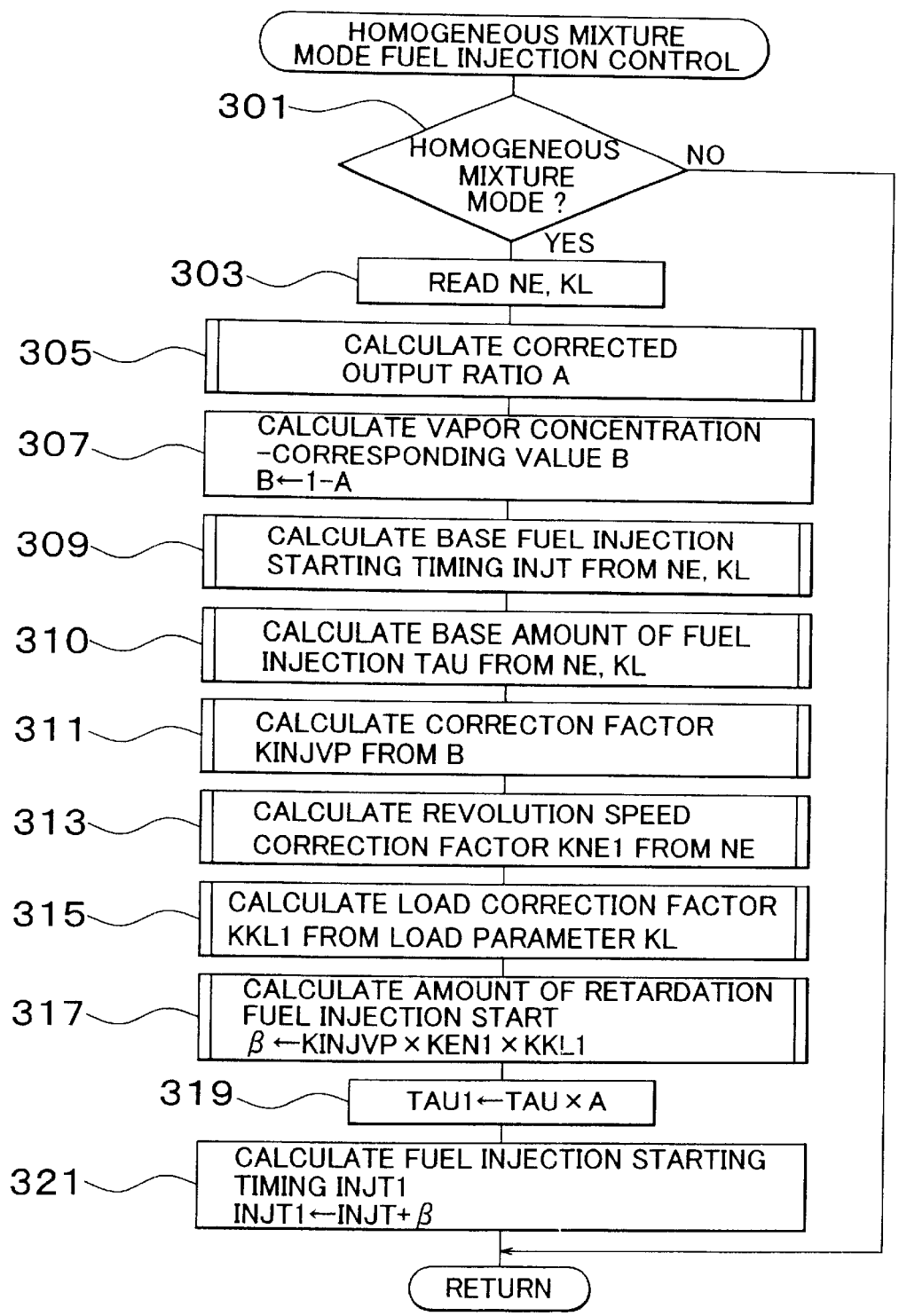
FIG. 3 is a flowchart illustrating a first embodiment of the fuel injection control operation of the invention.

FIG. 3 is a flowchart illustrating a purge-time fuel injection control operation in accordance with the embodiment. This operation is performed as a routine executed at every predetermined crank rotation angle.

When the operation illustrated in FIG. 3 starts, it is determined in step 301 whether the engine is presently operated in the homogeneous mixture combustion mode (i.e., any one of the modes (iii) to (v)). If the engine is presently operated in the homogeneous mixture combustion mode, a fuel injection control process of steps 303 to 321 is performed. Conversely, if it is determined in step 301 that the engine is not presently operated in the homogeneous mixture combustion mode (that is, the engine is presently operated in the stratified charge combustion operation mode or the weak stratified charge combustion operation mode), the ECU 30 executes a corresponding one of the fuel injection controls corresponding to the operation modes described separately below.

In step 303, a load parameter KL and the engine revolution speed NE calculated based on the output of the crank angle sensor 33 are inputted. As for the load parameter KL, the accelerator operation amount ACCP detected by the accelerator operation amount sensor 37 is used during the lean air-fuel ratio homogeneous mixture combustion mode (mode (iii)), and the intake pipe pressure detected by the intake pressure sensor 35 is used during the stoichiometric air-fuel ratio homogeneous mixture combustion mode (mode (iv)) or the rich air-fuel ratio homogeneous mixture combustion mode (mode (v)).

Then in step 305, a sensor output ratio a is calculated based on the oxygen concentration detected by the intake oxygen concentration sensor 31. Furthermore, based on the sensor output ratio a and the present engine operation air-fuel ratio, a corrected sensor output ratio A is calculated. The sensor output ratio a is given as the ratio between the output produced by the intake oxygen concentration sensor 31 when the purging is not performed, that is, the intake oxygen concentration RO occurring when the purging is not performed, and the output of the oxygen concentration sensor 31 at present (during execution of the purging) (that is, present intake oxygen concentration) RP, that is, $\alpha=RP/R0$.

If fuel vapor is present in intake air, oxygen in the intake air is consumed in the reaction with fuel vapor on the oxygen concentration sensor 31. Therefore, the oxygen concentration on the sensor 31 drops by an amount consumed in the reaction with fuel vapor, so that the sensor output becomes RP. That is, of the amount of oxygen in intake air, an amount of oxygen corresponding to $R0 \times (1-\alpha)$ is consumed by the reaction with fuel vapor. However, since the reaction between fuel and oxygen is an equivalent reaction, the reaction corresponds to combustion of a mixture having an air excess rate $\lambda=1$. Therefore, in order to carry out the combustion of, for example, a lean air-fuel ratio ($\lambda>1$), it is necessary to assign an amount of oxygen of $(1-\alpha) \times \lambda$ for the fuel vapor present in intake air. That is, in order to maintain the air excess rate $\lambda$ in each combustion chamber of the engine, the amount of oxygen that can be assigned for the fuel supplied by fuel injection reduces to $R0 \times (1-(1-\alpha) \times \lambda)$. That is, if the air excess rate $\lambda$ in the combustion chamber is kept unchanged in a case where fuel vapor is present, the amount of oxygen that can be used for combustion of the fuel supplied by fuel injection reduces to $(1-(1-\alpha) \times \lambda)$ multiplied by the oxygen concentration (R0) occurring when no fuel vapor is present in intake air.

In this case, since the amount of oxygen available for combustion of the fuel supplied by fuel injection reduces to the multiplication product by $(1-(1-\alpha) \times \lambda)$, it is necessary to reduce the amount of fuel injection by a reduction rate equal to the reduction rate of oxygen in order to maintain the same combustion air-fuel ratio despite the presence of fuel vapor in intake air. Therefore, if the intake oxygen sensor output ratio is a during a purge, the same air-fuel ratio as in the case where no fuel vapor is present can be maintained by reducing the amount of fuel injection to the multiplication product by $(1-(1-\alpha) \times \lambda)$.

In this embodiment, $(1-(1-\alpha) \times \lambda)$ calculated from $\alpha$ and $\lambda$ ($\lambda$=operation air-fuel ratio/stoichiometric air-fuel ratio) is defined as a corrected sensor output ratio A ($A=(1-(1-\alpha) \times \lambda)$), and the amount of fuel injection during execution of the purging is corrected by multiplying the base amount of fuel injection by the corrected sensor output ratio A.

After the corrected oxygen concentration sensor output ratio A is calculated in step 305, a value B corresponding to the fuel vapor concentration in intake air is calculated as in $B=1-A=(1-\alpha) \times \lambda$. The fuel vapor-corresponding value B is the proportion of the amount of reduction in the amount of fuel injection to the base amount of fuel injection, and is a value corresponding to the fuel vapor concentration in intake air.

In step 309 and step 310, a base fuel injection starting timing INJT and a base amount of fuel injection TAU, respectively, are calculated from the engine revolution speed NE and the load parameter KL inputted in step 303, with reference to a numerical table pre-stored in the ROM of the ECU 30.

Steps 311 to 317 illustrate an operation of calculating a fuel injection timing correction amount $\beta$. Since in this embodiment, the fuel injection control with reference to the fuel injection starting timing is performed, the correction amount $\beta$ is an amount representing the amount (crank angle) of retardation of the start of fuel injection.

The injection timing correction (retardation) amount $\beta$ is a crank angle corresponding to VP1 in line IV in FIG. 2, and is determined in accordance with the fuel vapor concentration-corresponding value B, the engine revolution speed NE and the engine load (load parameter KL).

Figure 4:
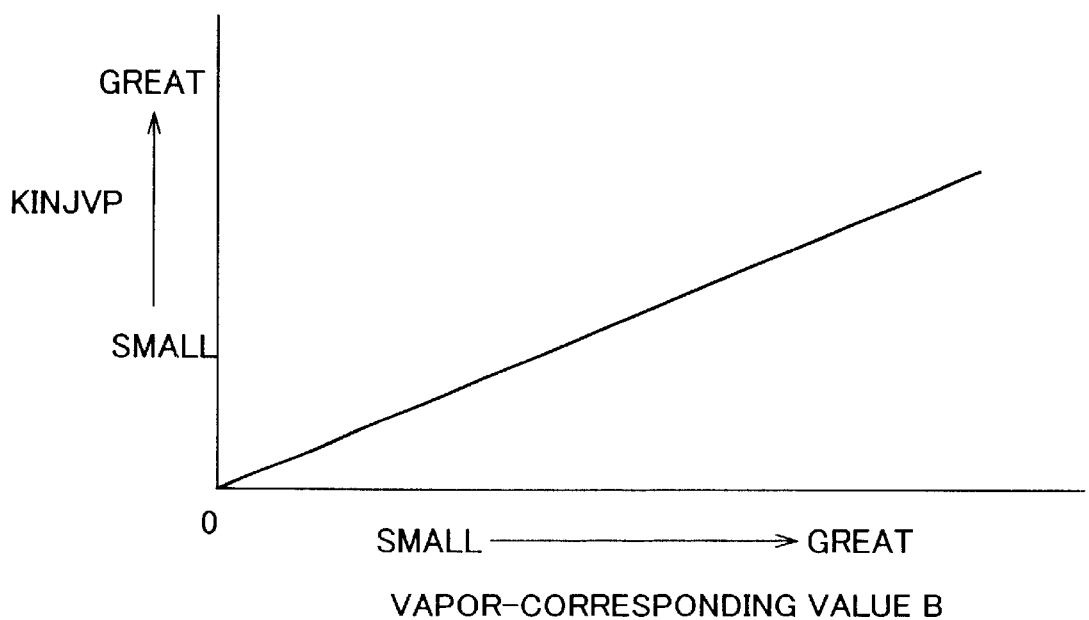
FIG. 4 is a graph indicating the setting of a factor for use in the control operation illustrated in FIG. 3.

That is, in step 311, a vapor correction amount KINJVP is determined based on the fuel vapor concentration-corresponding value B. The vapor correction amount KINJVP corresponds to a fuel injection duration that needs to be subtracted due to the presence of fuel vapor, and corresponds to a subtractive fuel injection duration VP(=VP1+VP2) in line IV in FIG. 2. FIG. 4 is a graph indicating a relationship between KINJVP and the vapor-corresponding value B. As indicated in FIG. 4, KINJVP (subtractive fuel injection duration) increases substantially proportionally to the vapor-corresponding value B.

In steps 313 and 315, a revolution speed correction factor KNE1 and a load correction factor KKL1 are determined based on the engine revolution speed NE and the load parameter KL, respectively. The correction factors KNE1 and KKL1 are factors for determining what fraction of the subtractive fuel injection duration KINJVP caused by fuel vapor is to be distributed to the side of retardation of the start of fuel injection (i.e., VP1 in line IV in FIG. 2). In practice, the relationships as indicated in FIGS. 5 and 6 are determined based on experiments.

Figure 5:
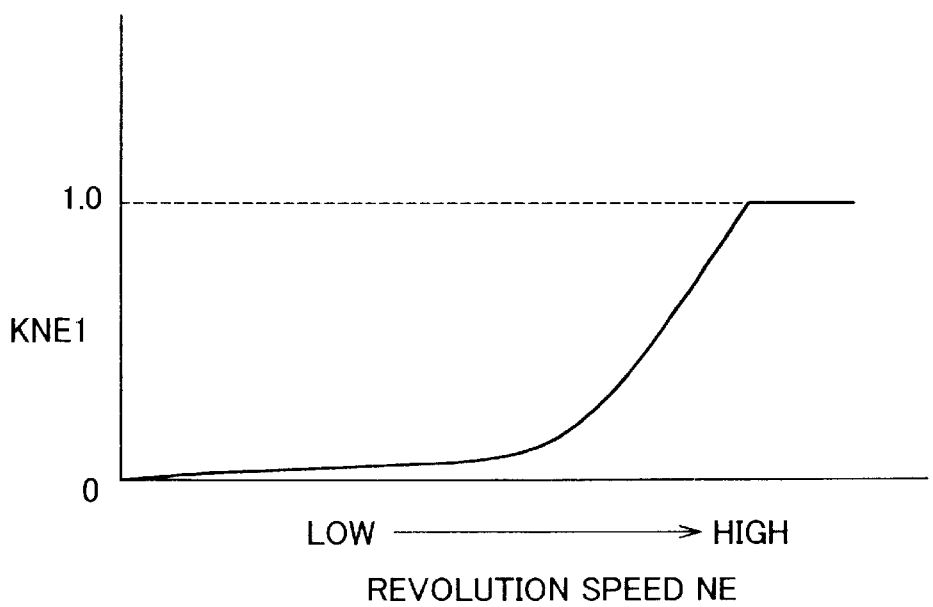
FIG. 5 is a graph indicating the setting of a factor for use in the control operation illustrated in FIG. 3.
Figure 6:
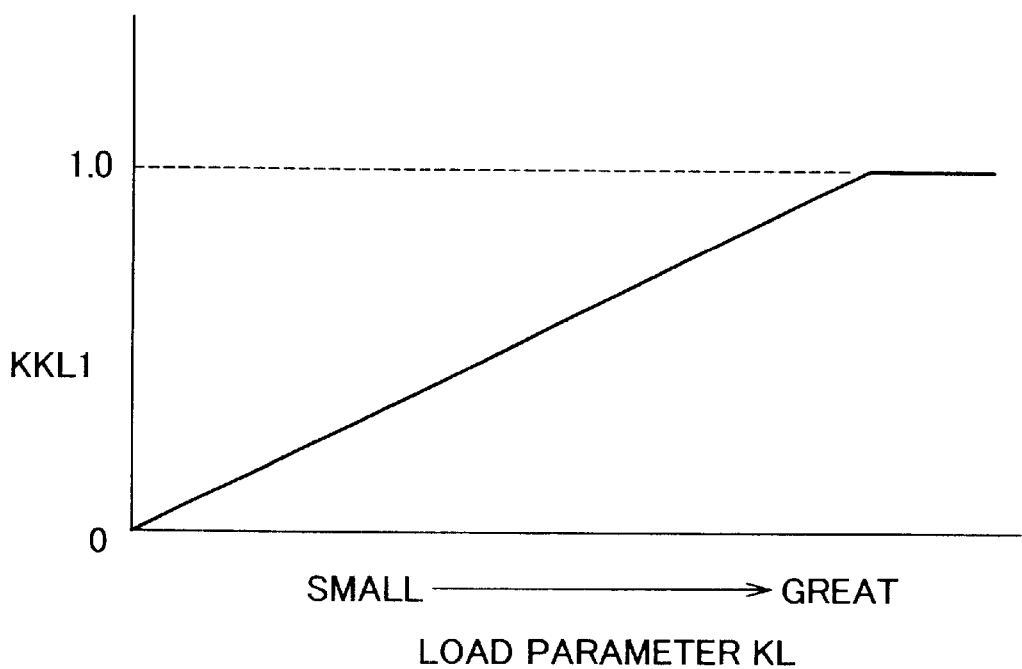
FIG. 6 is a graph indicating the setting of a factor for use in the control operation illustrated in FIG. 3.

FIGS. 5 and 6 are graphs indicating an example of the relationship between KNE1 and NE and an example of the relationship between KKL1 and KL, respectively. As indicated in the graphs, KNE1 and KKL1 increase with increases in NE and KL, respectively.

As mentioned above, during the intake stroke fuel injection mode, the fuel injection starting timing needs to be further advanced for higher engine revolution speeds and for greater loads (greater amounts of fuel injection), in order to secure a fuel injection duration. However, in some cases, the thus-set fuel injection starting timing is not necessarily optimal from the view point of formation of a homogeneous mixture. In this embodiment, therefore, if the engine revolution speed or the load is high, the fuel injection starting timing is retarded so as to bring the fuel injection starting timing close to an optimal timing.

The fuel injection timing retardation amount $\beta(\beta \geq 0)$ is calculated as in $\beta=\text{KINJVP} \times \text{KNE1} \times \text{KKL1}$ in step 317.

After the retardation amount $\beta$ is calculated, the base amount of fuel injection (fuel injection duration) TAU is reduced for correction based on the corrected oxygen concentration sensor output ratio A so that TAUL is calculated in step 319 as in TAU1=TAU×A.

Subsequently in step 321, an actual fuel injection starting timing INJT1 is calculated from the base fuel injection starting timing INJT as in INJT1=INJT+$\beta$. Therefore, during a fuel injection operation separately executed, the action of each fuel injection valve is controlled so that fuel injection from the fuel injection valve is started when the crank angle reaches INJT1, and so that the fuel injection is stopped when the fuel injection has continued for TAU1 (millisecond).

According to the embodiment, since the fuel injection starting timing INJT is expressed by the crank angle from the intake top dead center (ATDC), the fuel injection starting timing is retarded by an crank angle $\beta$ corresponding to the vapor-corresponding value B. Furthermore, since the fuel injection duration is also reduced, the fuel injection ending timing is also advanced in accordance with the vapor-corresponding value B as described above. Thus, both the fuel injection starting timing and the fuel injection ending timing are set to appropriate values corresponding to the amount of fuel injection.

2) Second Embodiment

In the first embodiment, the amount $\beta$ of retardation of the start of fuel injection is directly calculated from the correction factors KNE1 and KKL1. The second embodiment differs from the first embodiment in that a fuel injection start delay time (millisecond) is calculated from the vapor-corresponding value B, and the calculated delay time is converted into a retardation amount $\beta$ (crank angle). Therefore, the second embodiment makes it possible to set a fuel injection starting timing more precisely.

Figure 7:
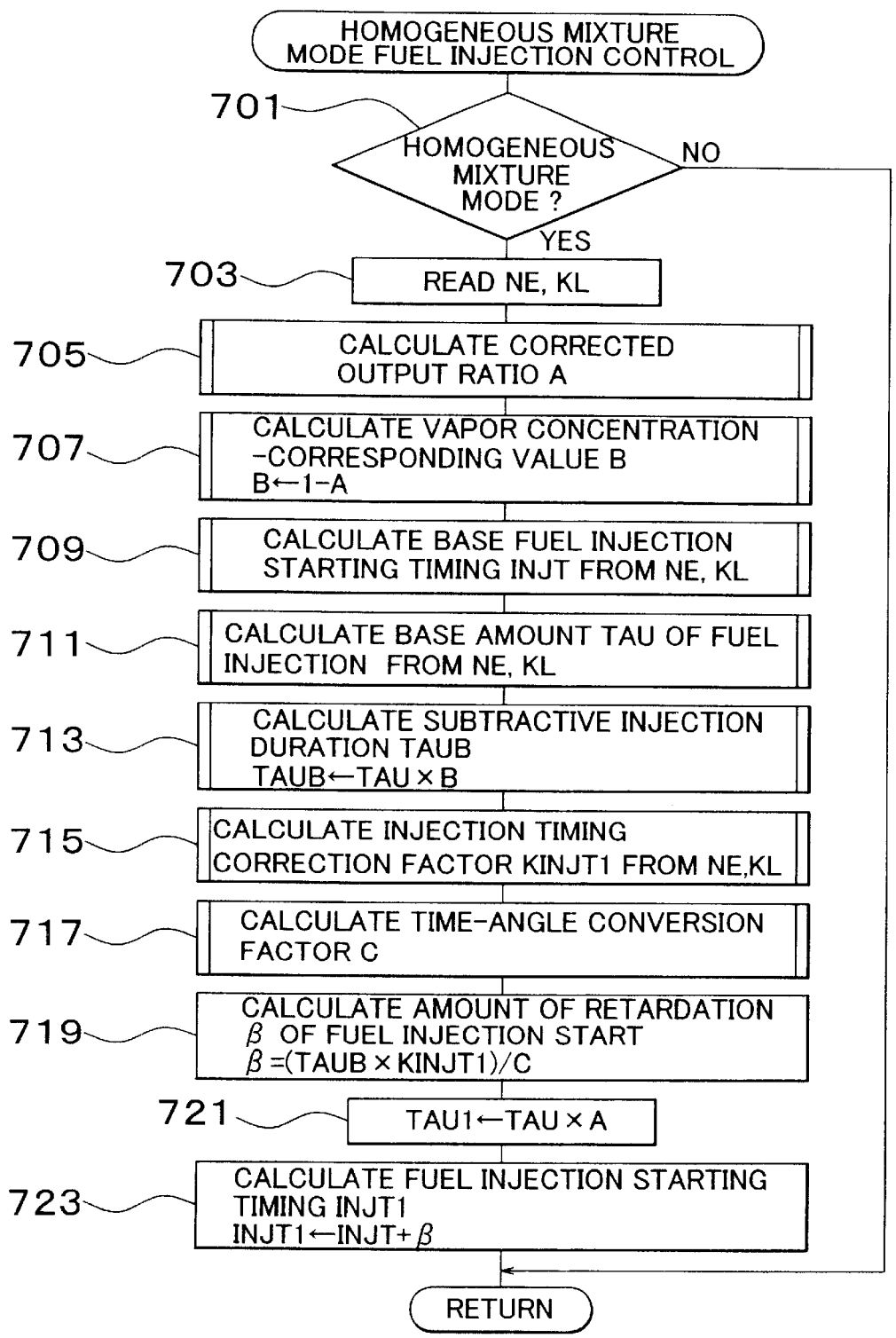
FIG. 7 is a flowchart illustrating a second embodiment of the fuel injection control operation of the invention.

FIG. 7 is a flowchart illustrating a fuel injection control operation in accordance with this embodiment. This operation is performed as a routine that is executed by the ECU 30 at every predetermined crank rotation angle.

In steps 701 to 709 in FIG. 7, a corrected sensor output ratio A, a vapor-corresponding value B and a base fuel injection starting timing INJT are calculated as in the operation illustrated in FIG. 3. The operation of steps 701 to 709 is the same as the operation of steps 301 to 309 in FIG. 3, and will not be described again.

After steps 701 to 709 are executed, a base fuel injection duration TAU (millisecond) is calculated based on the engine revolution speed NE and the load parameter KL in step 711 in this embodiment. Subsequently in step 713, an amount TAUB that needs to be subtracted from the fuel injection duration is calculated as in TAUB=TAU×B. The amount TAUB is a time (millisecond) corresponding to the time VP indicated in FIG. 2.

Subsequently in step 715, a correction factor KINJTI that represents the proportion of a portion of the subtractive time TAUB to be distributed as a fuel injection start retardation with respect to the entire subtractive time TAUB is calculated based on the engine revolution speed NE and the load parameter KL. In this embodiment, optimal values of the correction factor KINJT1 are pre-set based on experiments, and are stored in the ROM of the ECU 30 in the form of a two-dimensional numerical table that uses NE and KL. In step 715, a correction factor KINJT1 is determined from the numerical table, based on the values NE and KL inputted in step 703.

In step 717, a conversion factor C for converting the injection start delay time (millisecond) into the crank angle is calculated from the present engine revolution speed NE (RPM) as in C=(60×1000)/(NE×360).

Subsequently in step 719, the fuel injection start delay time is calculated as in TAUB×KINJT1, and is then converted into a crank angle, that is, an amount of retardation $\beta$(CA) of the start of fuel injection with respect to the base fuel injection starting timing, through the use of the aforementioned conversion factor.

In step 721, the actual fuel injection duration TAU1 is calculated as in TAU1=TAU×A, and the actual fuel injection starting timing INJT1 is set as in INJT1=INJT+$\beta$. Therefore, both the fuel injection starting timing and the fuel injection ending timing are set to more appropriate values based on the amount of fuel vapor, similarly to the first embodiment.

Although the first and second embodiments are described in conjunction with the case where the fuel injection control is performed with reference to the fuel injection starting timing, a similar control can also be performed in a case where the fuel injection is controlled with reference to the fuel injection ending timing. In that case, a good control can be realized if a correction factor that represents a fraction of the subtractive amount of fuel injection duration caused by the presence of fuel vapor that is to be distributed as an amount of advancement of the fuel injection ending timing is pre-stored in the ROM of the ECU 30, and the amount of advancement of the fuel injection ending timing is calculated by an operation similar to the operations illustrated in FIGS. 3 and 7.

(2) STRATIFIED CHARGE COMBUSTION

Correction of the compression stroke fuel injection during the stratified charge combustion operation in conjunction with the purging will now be described.

As for the compression stroke fuel injection during the stratified charge combustion operation, the fuel injection timing is set so that fuel is injected into an air in each cylinder that contains no fuel during the compression stroke so as to form a rich mixture layer. If the purging is performed during the stratified charge combustion operation, fuel is injected into a homogeneous mixture in each cylinder that contains fuel vapor by the compression stroke injection. Therefore, if at the time of a purge performed during the stratified charge combustion operation, the amount of fuel injection is reduced and the fuel injection is performed at the same timing as in an ordinary operation, the air-fuel ratio of a formed mixture layer may deviate to a rich air-fuel ratio, and ignition and combustion may deteriorate in some cases. In this embodiment, however, when the purging is performed during the stratified charge combustion operation, the rich-side deviation of the air-fuel ratio of mixture is prevented by advancing the ending timing of the compression stroke fuel injection so that injected fuel more easily diffuses.

1) Third Embodiment

Figure 8:
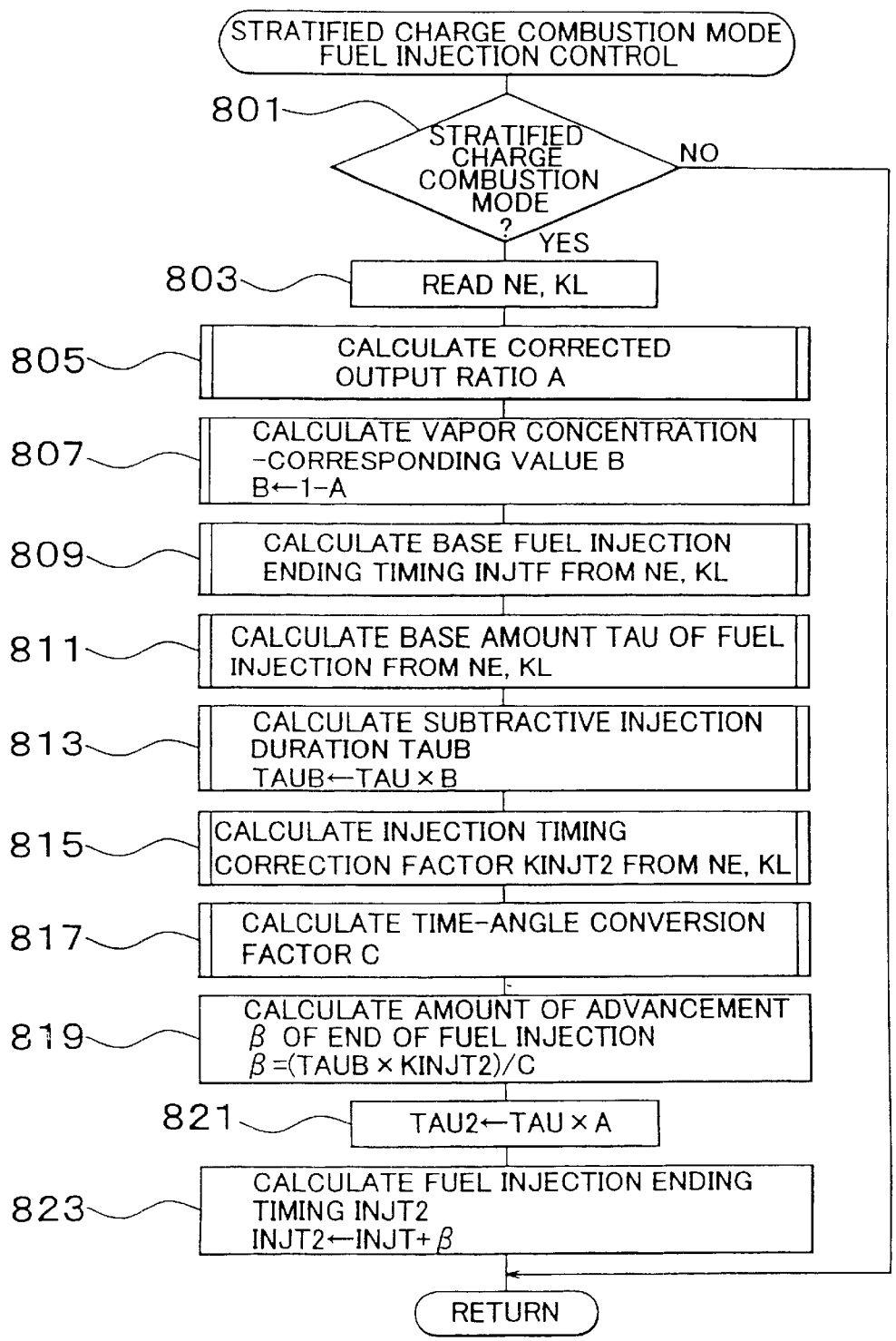
FIG. 8 is a flowchart illustrating a third embodiment of the fuel injection control operation of the invention.

FIG. 8 is a flowchart illustrating a fuel injection control operation performed during the stratified charge combustion operation. This control operation is executed by the ECU 30 at every predetermined crank angle rotation.

In this embodiment, a fuel injection control is performed with reference to the fuel injection ending timing. The calculation of the amount of fuel injection and the amount of advancement of the fuel injection ending timing is based on substantially the same concept as in the second embodiment described above in conjunction with the homogeneous mixture combustion.

In step 801 in FIG. 8, it is determined whether the engine is presently operated in the stratified charge combustion mode. A compression stroke fuel injection control of steps 803 to 823 is performed only if the engine is presently operated in the stratified charge combustion mode. If it is determined in step 801 that the engine is not presently operated in the stratified charge combustion mode (i.e., if the engine is presently operated in the homogeneous mixture combustion mode or the weak stratified charge combustion mode), a fuel injection control corresponding to the homogeneous mixture combustion mode or the weak stratified charge combustion mode is performed.

In step 803, the engine revolution speed NE and the aforementioned load parameter (the accelerator operation amount ACCP during the stratified charge combustion operation mode) KL are read. In steps 805 and 807, based on the output of the intake oxygen concentration sensor 31, a corrected sensor output ratio A and a vapor-corresponding value B are calculated. The operations of these steps are the same as those in the first and second embodiments.

Subsequently in steps 809 and 811, a base fuel injection ending timing INJTF and a base fuel injection duration TAU (millisecond) are determined from a numerical table pre-stored in the ROM of the ECU 30, by using the engine revolution speed NE and the load parameter KL. In step 813, a subtractive amount TAUB (millisecond) of fuel injection duration for the fuel vapor correction is calculated as in TAUB=TAU×B.

Subsequently in step 815, a fuel injection timing correction factor KINJT2 is calculated. The correction factor KINJT2 serves substantially in the same manner as in the correction factor KINJT1 in the second embodiment. In the third embodiment, the correction factor KINJT2 represents the proportion of a time portion of the subtractive amount of the fuel injection duration (corresponding to VP in FIG. 2) that is distributed to the earlier end side of the fuel injection ending timing (corresponding to VP2 in FIG. 2) with respect to the entire subtractive amount. The correction factor KINJT2 is set separately for various combinations of engine revolution speeds NE and loads KL based on experiments, and is stored in the ROM of the ECU 30 in the form of a two-dimensional numerical table that uses NE and KL.

After the correction factor KINJT2 is calculated in step 815, a conversion factor C for converting the fuel injection duration into the crank angle is determined in step 817. In step 819, an amount of advancement β of the fuel injection ending timing is calculated. The operations of steps 817 and 819 are substantially the same as the operation of steps 717 and 719 in FIG. 7.

In step 821, an actual amount of fuel injection TAU2 of the compression stroke fuel injection is calculated from the corrected sensor output ratio A and the compression stroke base fuel injection amount TAU as in TAU2=TAU×A. Subsequently in step 823, an actual fuel injection ending timing INJTF2 is calculated from the amount of advancement β of the fuel injection ending timing calculated in step 819 and the base fuel injection ending timing INJTF of the compression stroke fuel injection as in INJTF2=INJTF+β. The compression stroke fuel injection ending timing INJTF is defined by the crank angle up to the compression top dead center (BTDC). Therefore, INJTF2 is advanced by β from the base fuel injection ending timing INJTF.

As a result, the compression stroke fuel injection is started at TAU (millisecond) before the crank angle reaches INJTF2, and is ended when the crank angle reaches INJTF2. Thus, both the fuel injection starting timing and the fuel injection ending timing are set to more appropriate values.

2) Fourth Embodiment

Figure 9:
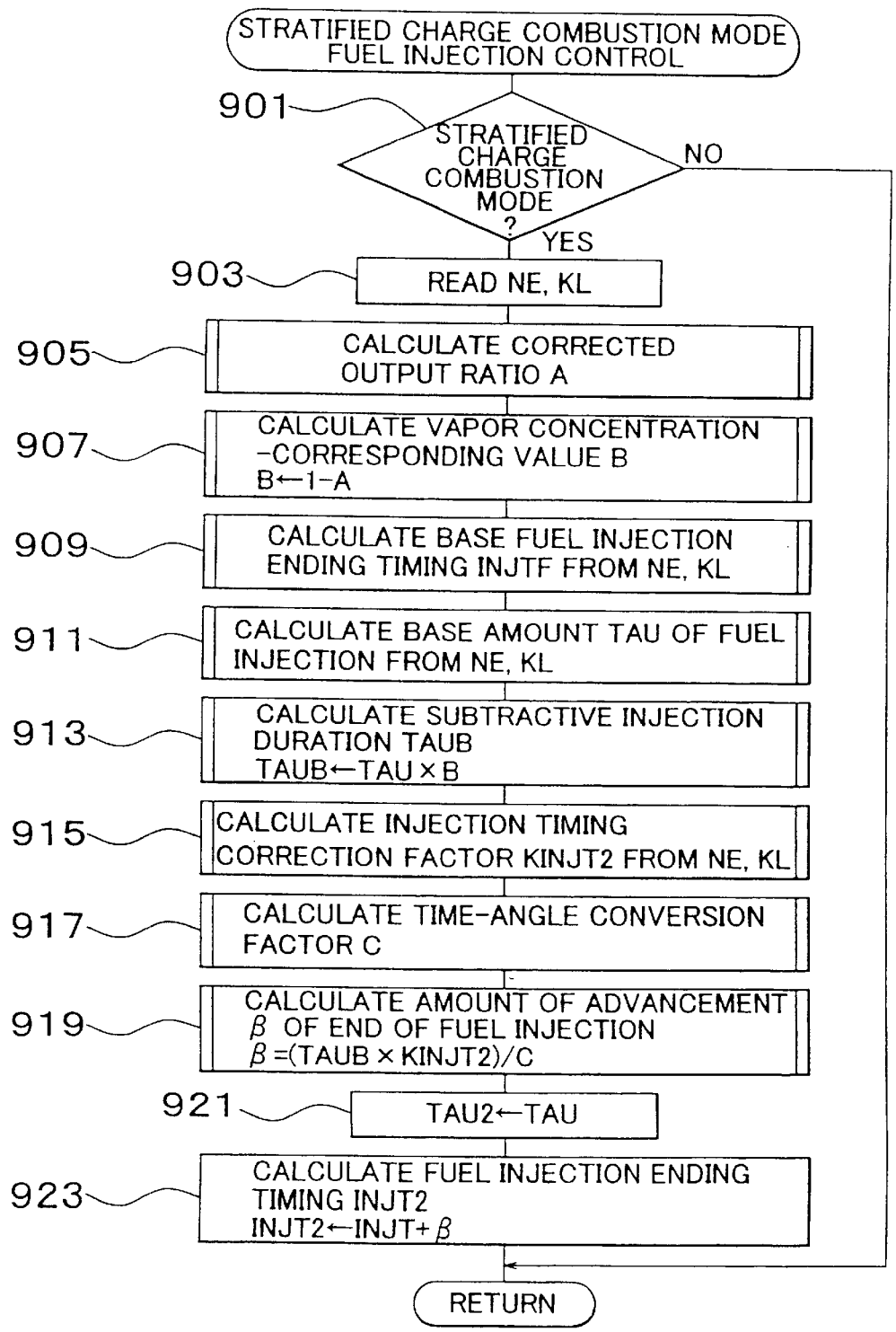
FIG. 9 is a flowchart illustrating a fourth embodiment of the fuel injection control operation of the invention.

FIG. 9 is a flowchart illustrating a compression stroke fuel injection control that is different from the control operation of the third embodiment.

The operation illustrated in the flowchart in FIG. 9 is substantially the same as the operation illustrated in FIG. 8, except that in step 921, an actual fuel injection amount TAU2 is set as in TAU2=TAU.

That is, in this embodiment, the amount of fuel injection is not reduced for correction at the time of execution of the purging whereas the fuel injection ending timing is corrected in accordance with the amount of fuel vapor. In this embodiment, the fuel injection duration remains the same as the base fuel injection duration, and therefore, the fuel injection is advanced as a whole. As a result, injected fuel readily diffuses in each cylinder, so that the rich-side deviation of the air-fuel ratio of stratified mixture can be prevented without a need to correct the amount of fuel injection in the reducing direction. If the reducing correction of the amount of fuel injection is not performed, the value of the correction factor KINJT2 calculated in step 915 is set to a value greater than the value of the correction factor KINJT2 set in the case where the amount of fuel injection is reduced for correction in accordance with the amount of fuel vapor (in step 815 in FIG. 8), and becomes greater than the amount of advancement β of the fuel injection ending timing.

(3) WEAK STRATIFIED CHARGE COMBUSTION

A fuel injection control performed at the time of execution of the purging during the weak stratified charge combustion operation (the operation mode (ii)) will be described.

During the engine operation in the weak stratified charge combustion mode, both the intake stroke fuel injection for forming a homogeneous mixture and the compression stroke fuel injection for stratifying a mixture are performed. Therefore, basically, both the fuel injection timing control for the homogeneous mixture combustion (intake stroke fuel injection) and the fuel injection timing control for the stratified charge combustion (compression stroke fuel injection) are performed during the control of the fuel injection timing at the time of execution of the purging. As for the amount of fuel injection, an amount of fuel corresponding to the amount of fuel supplied in the form of fuel vapor is subtracted from both the amount of intake stroke fuel injection and the amount of compression stroke fuel injection.

In the conventional art, the amount of intake stroke fuel injection and the amount of compression stroke fuel injection are reduced at the same rate in accordance with the amount of fuel vapor. However, this embodiment differs from the conventional-art fuel injection amount correction in that the amount of intake stroke fuel injection and the amount of compression stroke fuel injection are reduced at different rates in accordance with the amount of fuel vapor.

The fuel supplied into each cylinder in the form of fuel vapor diffuses homogeneously into intake air, and forms a homogeneous mixture. Therefore, reducing the amount of compression stroke fuel injection for the purpose of correction for the amount of fuel supplied in the form of fuel vapor means that an amount of fuel that would be stratified by the compression stroke fuel injection is replaced by an amount of fuel supplied into each cylinder in the form of a homogeneous mixture. Hence, such reduction of the amount of compression stroke fuel injection gives rise to a problem of lean-side deviation of the air-fuel ratio of a stratified mixture formed by the compression stroke fuel injection.

Therefore, in this embodiment, correction for the amount of fuel vapor is achieved by reducing the amount of intake stroke fuel injection without reducing the amount of compression stroke fuel injection as long as such a manner of correction is possible. The amount of compression stroke fuel injection is reduced, for example, only in a case where a large amount of fuel vapor exceeding the amount of intake stroke fuel injection is supplied so that even the reduction of the amount of intake stroke fuel injection to zero cannot achieve an air-fuel ratio equal to the ratio that occurs when the purging is not performed. Hence, the air-fuel ratio of a stratified mixture formed by the compression stroke fuel injection is kept at a value that is optimal for ignition and combustion, regardless of the presence/absence of purged fuel vapor. Thus, deterioration of combustion is prevented.

5) Fifth Embodiment

Figure 10:
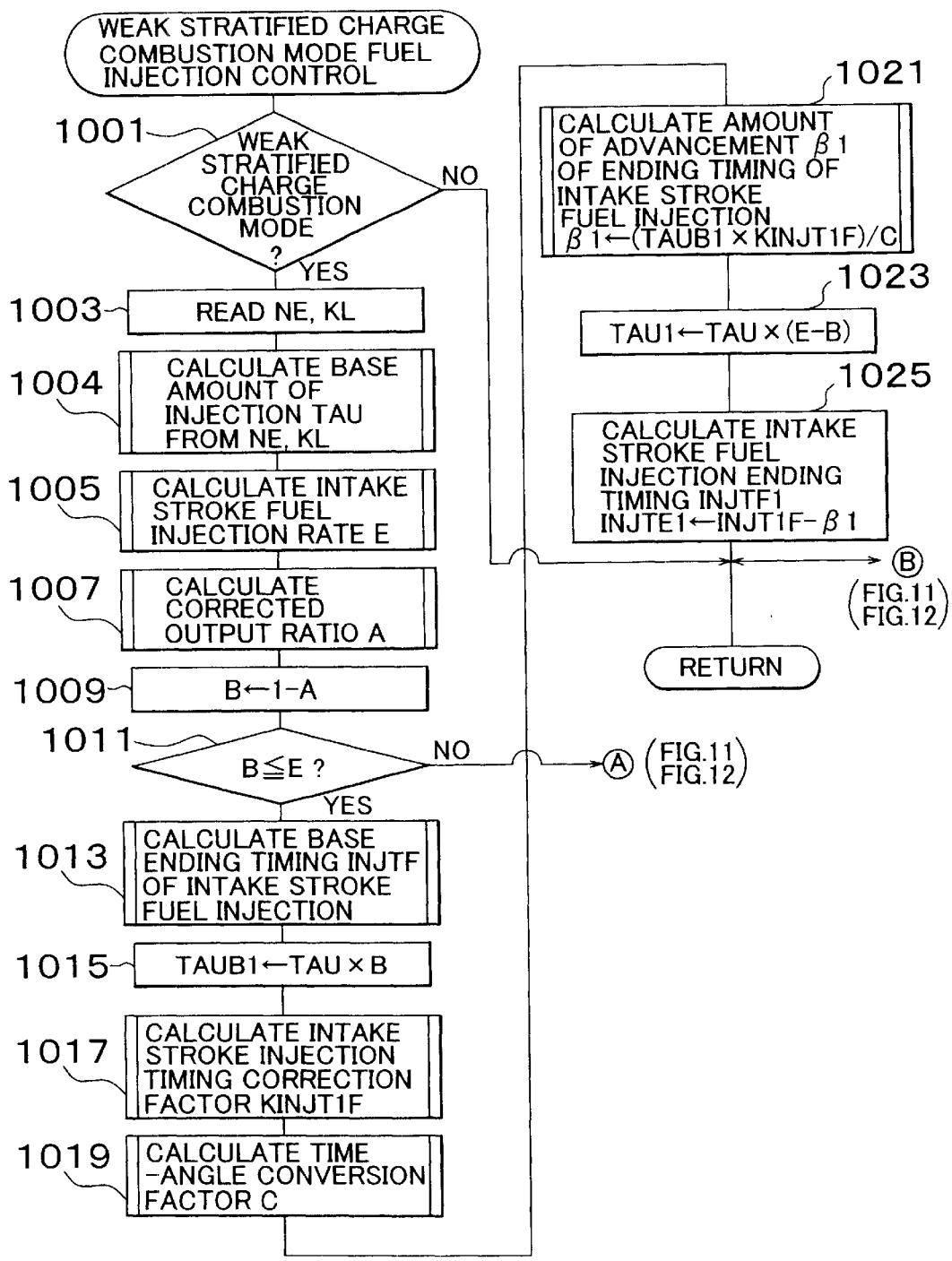
FIG. 10 is a portion of a flowchart illustrating a fifth embodiment of the fuel injection control operation of the invention.
Figure 11:
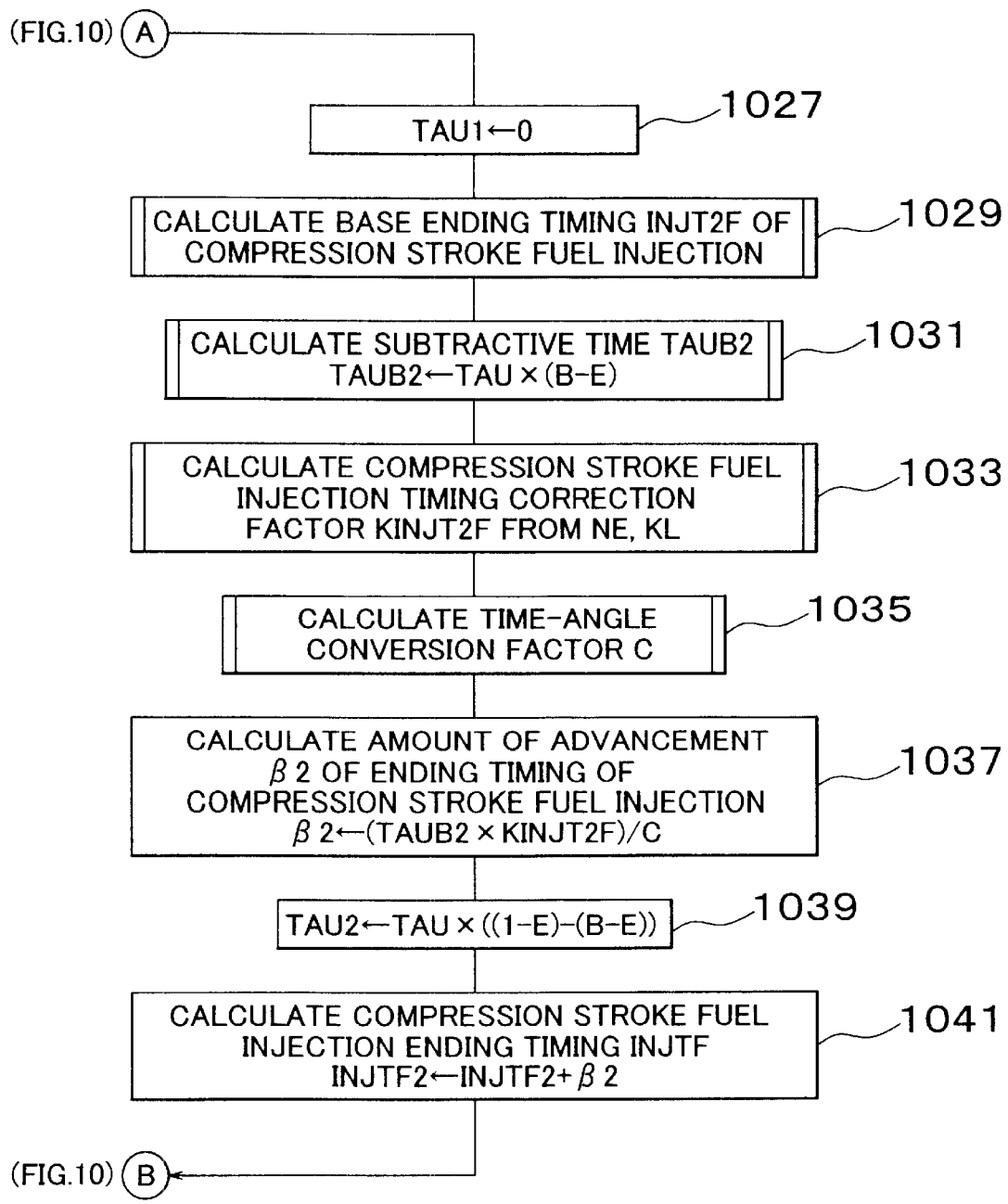
FIG. 11 is a portion of the flowchart illustrating the fifth embodiment of the fuel injection control operation of the invention.

FIGS. 10 and 11 are a flowchart illustrating a fuel injection control operation performed at the time of execution of the purging during the weak stratified charge combustion mode operation. This operation is executed by the ECU 30 at every predetermined crank angle.

In this embodiment, if the vapor-corresponding value B corresponding to the fuel vapor present in intake air calculated from the corrected intake oxygen concentration sensor output ratio A is less than an intake stroke fuel injection rate E, the entire amount of the vapor-corresponding value B is subtracted from the amount of intake stroke fuel injection, and the amount of compression stroke fuel injection is not reduced. If the vapor-corresponding value B becomes equal to or greater than the intake stroke fuel injection rate E, the intake stroke fuel injection is suspended. For the remainder or excess amount of fuel TAU×(B−E), adjustment is made by reducing the amount of compression stroke fuel injection.

When the operation illustrated in FIGS. 10 and 11 starts, it is determined in step 1001 whether the engine is presently operated in the weak stratified charge combustion mode. The operation starting at step 1003 is performed only if the engine is presently operated in the weak stratified charge combustion mode. If the engine is presently operated in an operation mode other than the weak stratified charge combustion mode (in the homogeneous mixture combustion mode or the stratified charge combustion mode), the fuel injection control for the homogeneous mixture combustion or the stratified charge combustion described above is performed.

Next, in step 1003, the engine revolution speed NE and the load parameter KL (accelerator operation amount ACCP in this case) are read in. Subsequently in steps 1004, 1005, a base total amount of fuel injection (total of the amount of intake stroke fuel injection and the amount of compression stroke fuel injection provided when the purging is not performed) TAU and an intake stroke fuel injection rate E are determined. The intake stroke fuel injection rate E ($E \leq 1$) is the proportion of the amount of intake stroke fuel injection to the total amount of fuel injection TAU (amount of intake stroke fuel injection/(amount of intake stroke fuel injection+ amount of compression stroke fuel injection)) in the case where the purging is not performed. In this embodiment, values of the total amount of fuel injection TAU and values of the intake stroke fuel injection rate E which are optimal for various combinations of engine revolution speeds NE and load parameters KL are determined beforehand based on experiments in which an engine is operated in the weak stratified charge combustion mode. The optimal values of the total amount of fuel injection TAU and the optimal values of the intake stroke fuel injection rate E are separately pre-stored in the ROM of the ECU 30 as two-dimensional numerical tables that use NE and KL. In step 1007, a corrected sensor output ratio A is calculated from the output of the oxygen concentration sensor 31. In step 1009, a vapor-corresponding value B is determined as in B=1−A.

Subsequently in step 1011, it is determined whether the present amount of fuel vapor in intake air is at most the base amount of intake stroke fuel injection. As mentioned above, in order to maintain the engine air-fuel ratio despite the purging, it is necessary to reduce the total amount of fuel injection TAU by an amount of TAU×(1−A)=TAU×B. That is, the amount of fuel vapor in intake air can be expressed as TAU×B. Since the base amount of intake stroke fuel injection is expressed as TAU×E, determination as to whether the amount of fuel vapor in intake air is equal to or less than the base amount of intake stroke fuel injection can be made by comparing the vapor-corresponding value B determined from the corrected sensor output ratio A and the value of the intake stroke fuel injection rate E.

If it is determined in step 1011 that the amount of fuel vapor in intake air is at most the base amount of intake stroke fuel injection, that is, if $B \leq E$, it is possible to achieve a correction for the entire amount of fuel vapor in intake air by reducing the amount of intake stroke fuel injection. In this case, therefore, an intake stroke fuel injection correcting operation of steps 1013 to 1025 is performed.

The intake stroke fuel injection correcting operation of steps 1013 to 1025 is basically the same as the fuel injection correction performed during the homogeneous mixture combustion mode illustrated in FIG. 3.

That is, in step 1013, an intake stroke fuel injection engine timing INJT1F is determined from the engine revolution speed NE and the load parameter KL, with reference to a numerical table pre-stored in the ROM of the ECU 30. In step 1015, a subtractive amount TAUB1 of the intake stroke fuel injection duration which is needed to achieve a correction for the entire amount of fuel vapor in intake air by reducing the amount of intake stroke fuel injection is calculated as in TAUB1=TAU×B. In step 1017, a correction factor KINJT1F for the injection timing is determined from the engine revolution speed NE and the load parameter KL with reference to a numerical table pre-stored in the ROM of the ECU 30. The correction factor KINJT1F is a factor for determining what fraction of the subtractive amount of intake stroke fuel injection duration is to be distributed to the side of advancement of the injection ending timing. Values of the correction factor KINJT1F optimal for various combinations of engine revolution speeds NE and loads KL are determined beforehand based on experiments using a real engine, and are pre-stored in the ROM of the ECU 30 in the form of a two-dimensional numerical table that uses NE and KL.

Subsequently in step 1019, a conversion factor C for converting the injection duration into the crank angle is calculated based on the present engine revolution speed NE. In step 1021, an amount of advancement β1 (CA) of the intake stroke fuel injection ending timing is determined from TAUB1 and the correction factors KINJT1F and C as in β1=(TAUB1×KINJT1F)/C.

Subsequently in step 1021, an actual amount (duration) of intake stroke fuel injection TAU1 for achieving the correction for the fuel vapor present in intake air is calculated as in TAU1=TAU×(E−B). In step 1025, an intake stroke fuel injection ending timing INJTF1 (CA) is calculated as in INJTF1=INJT1F−β1. The intake stroke fuel injection ending timing INJTF1 is expressed by the crank angle after the intake stroke top dead center (ATDC). Therefore, the fuel injection ending timing is advanced by β1 in terms of the crank angle (CA).

Therefore, the starting timing and the ending timing of the intake stroke fuel injection are adjusted to appropriate values in accordance with the amount of fuel vapor. If the correction for the entire amount of fuel vapor present in intake air can be accomplished by reducing the amount of intake stroke fuel injection, the air-fuel ratio of a homogeneous mixture formed remains the same regardless of the presence/absence of purged fuel vapor, so that correction of the amount or timing of the compression stroke fuel injection is not performed. That is, in this case, the amount and the timing of the compression stroke fuel injection are set to the base amount of fuel injection and the base fuel injection timing, respectively.

Next described will be a correction performed if B>E is determined in step 1011, that is, if the amount of fuel vapor in intake air is greater than the amount of intake stroke fuel injection. In this case, the intake stroke fuel injection is suspended (that is, TAU1=0), and the correction for the remainder or excess amount of fuel vapor TAU×(B−E) is accomplished by reducing the amount of compression stroke fuel injection, as mentioned above.

That is, if B>E is determined in step 1011, the operation proceeds to step 1027 in FIG. 11, in which the amount of intake stroke fuel injection TAU1 is set to TAU1=0 to suspend the intake stroke fuel injection.

In step 1029, a base fuel injection ending timing INJT2F of the compression stroke fuel injection is determined from the value of engine revolution speed NE and the value of load parameter KL with reference to a numerical table stored in the ROM of the ECU 30.

In steps 1031 to 1041, the amount of compression stroke fuel injection is reduced by the amount TAU×(B−E), and the ending timing of the compression stroke fuel injection INJTF2 is set by advancing the timing by an amount β2 determined in accordance with the subtractive rate (B−E) of the fuel injection amount, the engine revolution speed NE and the load parameter KL. The operation of steps 1031 to 1041 is substantially the same as the operation of steps 813 to 823 in the fuel injection correction performed during the stratified charge combustion mode illustrated in FIG. 8. That is, the rate (B−E) used in step 1031 is a subtractive rate of the compression stroke fuel injection amount, and corresponds to the vapor-corresponding value B in step 813 in FIG. 8. The amount TAU2=TAU×((1−E)−(B−E)) determined in step 1039 corresponds to TAU2=TAU×A in step 821 in FIG. 8.

Therefore, even if the amount of fuel vapor becomes greater than the amount of intake stroke fuel injection and there arises a need to correct the compression stroke fuel injection, the starting timing and the ending timing of the compression stroke fuel injection are set to optimal values in accordance with the amount of fuel vapor.

6) Sixth Embodiment

Another embodiment of the fuel injection correcting operation performed at the time of the purging during the weak stratified charge combustion engine operation will be described. In the above-described fifth embodiment, the intake stroke fuel injection is suspended if the amount of fuel vapor in intake air becomes equal to or greater than the amount of intake stroke fuel injection. In the sixth embodiment, however, even if the amount of fuel vapor in intake air becomes equal to or greater than the amount of intake stroke fuel injection, the intake stroke injection of a predetermined amount of fuel is performed, and the total of the amount of fuel injected during the intake stroke and the amount of fuel vapor in intake air is subtracted from the amount of compression stroke fuel injection. In this manner, the engine operation air-fuel ratio as a whole is kept constant regardless of the presence/absence of purged fuel vapor. In this case, the intake stroke fuel injection of a predetermined amount is performed during a latter half period of the intake stroke, so that injected fuel does not homogeneously diffuse. Therefore, the fuel injected during the intake stroke of each cylinder forms, within a homogeneous mixture containing fuel vapor, a mixture layer that has a lower (richer-side) air-fuel ratio than the homogeneous mixture. During the compression stroke fuel injection, fuel is injected into the relatively low air-fuel ratio mixture layer, and forms a rich mixture layer. Thus, an intermediate air-fuel ratio mixture layer formed by fuel injected during the intake stroke exists between the rich mixture layer formed by the compression stroke fuel injection and the high air-fuel ratio (fuel-lean) homogeneous mixture. Therefore, when ignition occurs in the rich mixture layer, flames smoothly propagate to the very lean homogeneous mixture via the intermediate air-fuel ratio mixture layer. In an ordinary stratified charge combustion, there are cases where smooth propagation of flames from the stratified rich air-fuel ratio mixture layer to the homogeneous mixture layer present in each cylinder is not easy due to a considerably great difference in air-fuel ratio between the stratified rich air-fuel ratio mixture layer and the homogeneous mixture. In the embodiment, however, smooth propagation of flames is ensured due to the provision of a mixture layer having an intermediate air-fuel ratio between the rich air-fuel ratio mixture layer and the homogeneous mixture layer, so that the state of combustion in the weak stratified charge combustion mode can be improved.

The aforementioned advantages will be described in detail.

Let it assumed herein that the base amount of fuel injection for the intake stroke fuel injection is 0.25 gram, and the base amount of fuel injection for the compression stroke fuel injection is 0.35 gram, and the amount of intake air during a cycle is 20 grams.

If the purging is not performed in this assumed case, the air-fuel ratio AF1 of a homogeneous mixture formed by the intake stroke fuel injection is AF1=20/0.25=80.

If it is assumed that the fuel injected during the compression stroke mixes with 6 grams of the homogeneous mixture within the cylinder, and forms a rich-side air-fuel ratio mixture layer, the air-fuel ratio AF2 of the stratified mixture becomes AF2=6/(0.35+6/80)=14.1 since the air-fuel ratio of the homogeneous mixture is 80 and the amount of compression stroke fuel injection is 0.35 gram. The air-fuel ratio AFa in the entire cylinder becomes AFa=20/(0.25+0.35)=33.3.

That is, in the base state, the air-fuel ratio AF2 of the stratified mixture around the ignition plug is 14.1, and the air-fuel ratio of the homogeneous mixture in the cylinder is 80. Thus, there is a relatively great air-fuel ratio difference between the two mixtures. Therefore, there are cases where propagation of flames from the stratified mixture to the homogeneous mixture is not altogether smooth.

Let it now assumed that a purge is performed such that 0.3 graph of fuel vapor is contained in 20 grams of intake air. In this case, the fuel injection vapor amount (0.3 gram) exceeds the amount of intake stroke fuel injection (0.25 gram). According to the fifth embodiment, therefore, the intake stroke fuel injection is suspended, and the amount of compression stroke fuel injection is reduced from 0.35 gram to 0.3 gram=0.35−(0.3−0.25).

Since fuel vapor is drawn into the cylinder in the form of a homogeneous mixture, the compression stroke fuel injection injects fuel into a homogeneous mixture having an air-fuel ratio AF1=20/0.3=66.7 in this case. Furthermore, as a result of the reduction of the amount of compression stroke fuel injection, the amount of air-fuel mixture that mixes with the fuel injected by the compression stroke fuel injection also reduces. If it is assumed that the amount of air-fuel mixture that mixes with the fuel injected by the compression stroke fuel injection reduces to 5.14 grams, the air-fuel ratio AF2 of the mixture formed by the compression stroke fuel injection becomes equal to AF2=5.14/(0.3+5.14/66.7)=13.6.

That is, the difference between the air-fuel ratios AF1 and AF2 is still great although it becomes slightly less than the difference occurring when no purge is performed.

According to the embodiment, however, the intake stroke injection of a predetermined amount of fuel is performed in the aforementioned case. For example, if 0.05 gram of fuel is injected during a latter half period of the intake stroke, and mixes with 15 grams of the homogeneous mixture, the intake stroke fuel injection forms an intermediate air-fuel ratio mixture layer that has an air-fuel ratio AF3=15/(0.05+15/66.7)=54.6. As for the compression stroke fuel injection, the amount of fuel injected during the intake stroke also needs to be subtracted from the amount of compression stroke fuel injection. Therefore, the reduced amount of compression stroke fuel injection becomes equal to an amount that is 0.05 gram less than the reduced amount in the fifth embodiment, that is, the reduced amount of compression stroke fuel injection in the sixth embodiment becomes equal to 0.25 gram. Therefore, during the compression stroke fuel injection, 0.25 gram of fuel is injected into the intermediate air-fuel ratio mixture having the air-fuel ratio AF3=54.6. If this amount of fuel mixes with 4.29 grams of mixture, the air-fuel ratio AF2 of the mixture stratified around the ignition plug by the compression stroke fuel injection becomes AF2=4.29/(0.25+4.29/54.6)=13.1. Thus, the stratified mixture around the ignition plug has a richer-side air-fuel ratio, in comparison with the stratified mixture in the fifth embodiment. However, in the sixth embodiment, the difference between the air-fuel ratio AF3 of the intermediate air-fuel ratio mixture and the air-fuel ratio AF1 of the stratified mixture becomes even less than in the fifth embodiment. Therefore, flames formed by ignition in the stratified mixture smoothly propagate to the homogeneous mixture via the intermediate air-fuel ratio mixture.

Figure 12:
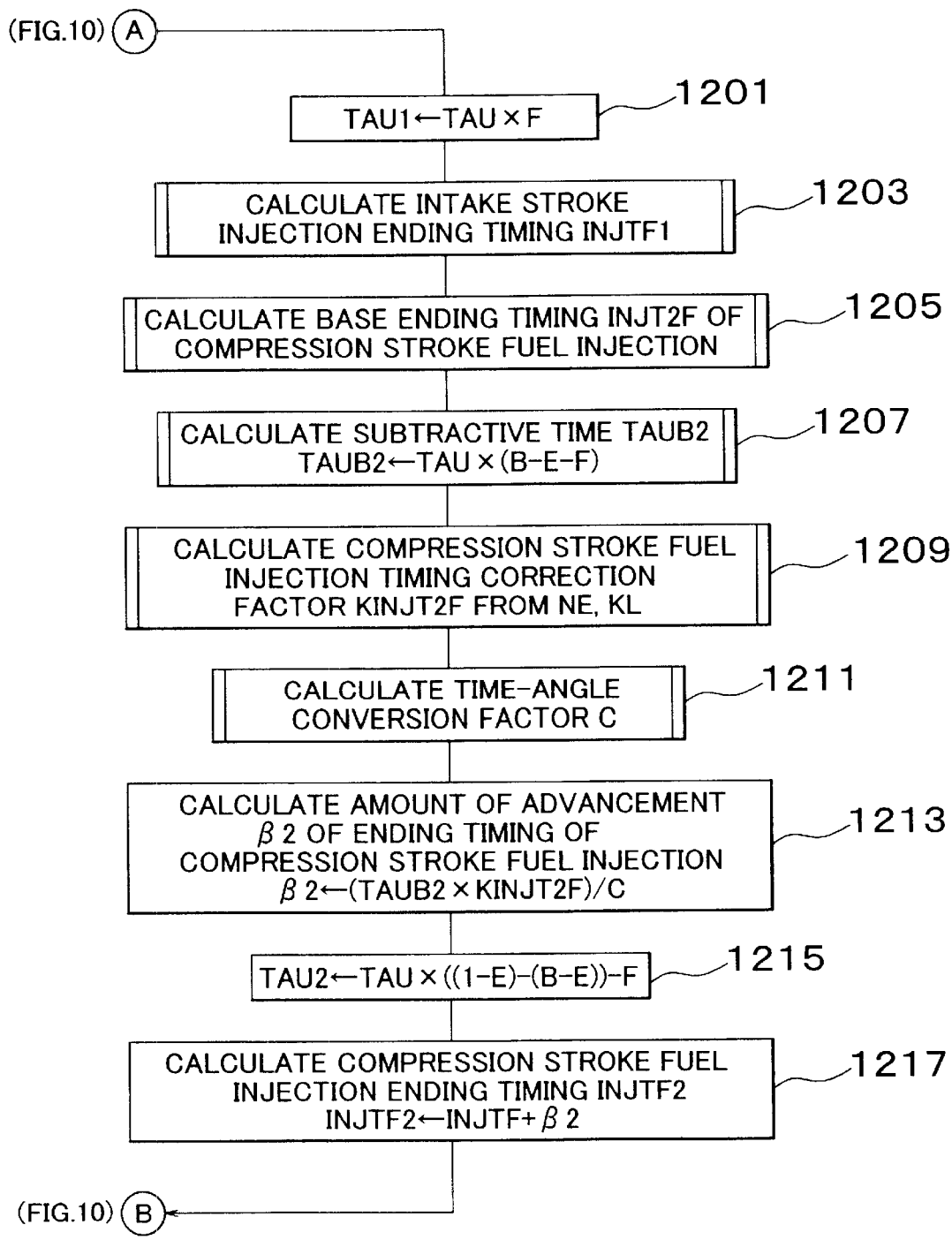
FIG. 12 is a portion of a flowchart illustrating a sixth embodiment of the fuel injection control operation of the invention.

FIG. 12 is a flowchart illustrating a fuel injection control of this embodiment in detail. The operation illustrated in FIG. 12 is a substitute for the operation of the fifth embodiment illustrated in FIG. 11, and is executed together with the operation illustrated in FIG. 10. That is, according to the sixth embodiment, if it is determined in step 1011 in FIG. 10 that the amount of fuel vapor in intake air is greater than the base amount of intake stroke fuel injection (B>E), the operation proceeds to step 1201 in FIG. 12, in which the amount of intake stroke fuel injection TAU1 is calculated as in TAU1=TAU×F. In this equation, TAU is the base total amount of fuel injection determined in step 1005 in FIG. 10. Further, in the equation, F is a relatively small constant value (e.g., a value of about 0.05 to about 0.1) in this embodiment. Subsequently in step 1203, the intake stroke fuel injection ending timing INJTTF1 is determined based on the engine revolution speed NE and the load parameter KL. As for the intake stroke fuel injection performed after B>E is determined in step 1011, it is necessary to form an intermediate air-fuel ratio mixture layer that has a lower air-fuel ratio than the surrounding mixture by preventing homogeneous diffusion of injected fuel, unlike the ordinary intake stroke fuel injection for forming a homogeneous mixture. Therefore, the injection ending timing INJTF1 set in step 1011 is set to a timing within a latter half period of the intake stroke, unlike the injection ending timing INJETF1 set in step 1025 in FIG. 10. In this embodiment, values of the fuel injection ending timing optimal for formation of an intermediate mixture layer are empirically determined beforehand in accordance with various combinations of engine revolution speeds NE and load parameters KL, and are pre-stored in the ROM of the ECU 30 in the form of a two-dimensional numerical table that uses the engine revolution speed NE and the load parameter KL as parameters. In step 1203, an ending timing INJTF11 of the intake stroke fuel injection is set based on the values NE and KL read in step 1003 in FIG. 10.

Steps 1205 to 1217 illustrate an operation of setting the amount of fuel injection and the injection ending timing of the compression stroke fuel injection. The operation of steps 1205 to 1217 is substantially the same as the operation of steps 1029 to 1041 in FIG. 11, except that in steps 1207 and 1215, the amount of fuel injection is further reduced based on a value F.

As described above, even if the amount of fuel vapor in intake air is greater than the amount of intake stroke fuel injection, a small amount of fuel is injected during a latter half period of the intake stroke, so that the state of combustion at the time of execution of the purging can be improved.

According to the foregoing embodiments, it becomes possible to perform a fuel injection control of achieving an optimal state of combustion in accordance with the selected operation mode regardless of the presence/absence of purged vapor even in a case where the purging is performed in a direct fuel injection-type spark injection engine.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A fuel injection control apparatus of a direct fuel injection type spark injection engine, comprising:

a fuel vapor purge device that supplies a fuel vapor from a fuel tank into an engine intake passage;

fuel vapor detecting means for detecting an amount of the fuel vapor in an engine intake air;

a direct fuel injection valve that injects fuel directly into a cylinder;

fuel injection control means for setting an amount of fuel injection from the direct fuel injection valve, a starting timing of the fuel injection and an ending timing of the fuel injection based on a state of operation of the engine; and injection timing correcting means for changing both the starting timing and the ending timing of the fuel injection from the direct fuel injection valve in accordance with the amount of the fuel vapor detected by the fuel vapor detecting means.

2. A fuel injection control apparatus according to claim 1, wherein the fuel injection control means executes fuel injection in a homogeneous combustion mode of executing the fuel injection from the fuel injection valve during an intake stroke of the cylinder so as to form a homogeneous mixture in the cylinder.

3. A fuel injection control apparatus according to claim 1, wherein the fuel injection control means executes fuel injection in a weak stratified charge combustion mode of executing the fuel injection from the fuel injection valve during an intake stroke so as to form a homogeneous mixture in the cylinder, and executes fuel injection during a compression stroke so as to form a mixture layer that has a low air-fuel ratio in the homogeneous mixture.

4. A fuel injection control apparatus according to claim 1, wherein the fuel injection control means executes fuel injection in a stratified charge combustion mode of executing fuel injection from the fuel injection valve during a compression stroke so as to form a combustible mixture layer in an air in the cylinder.

5. A fuel injection control apparatus according to claim 1, wherein in accordance with the state of operation of the engine, the fuel injection control means performs fuel injection by selecting one of:

a homogeneous combustion mode fuel injection in which fuel injection from the fuel injection valve is performed during an intake stroke so as to form a homogeneous mixture in the cylinder;

a weak stratified charge combustion mode fuel injection in which fuel injection from the fuel injection valve is performed during the intake stroke so as to form a homogeneous mixture in the cylinder, and in which fuel injection is performed during a compression stroke so as to form a mixture layer having a low air-fuel ratio in the homogeneous mixture; and a stratified charge combustion mode fuel injection in which fuel injection from the fuel injection valve is performed during the compression stroke so as to form a combustible mixture layer in an air of the cylinder.

6. A fuel injection control apparatus of a direct fuel injection type spark ignition engine, comprising:

a fuel vapor purge device that supplies a fuel vapor from a fuel tank into an engine intake passage;

fuel vapor detecting means for detecting an amount of the fuel vapor in an engine intake air;

a direct fuel injection valve that injects fuel directly into a cylinder;

fuel injection amount setting means for setting an amount of fuel injection from the direct fuel injection valve based on a state of operation of the engine;

fuel injection control means for executing a fuel injection in which the amount of fuel injection set by the fuel injection amount setting means is injected into the cylinder in a divided manner by an intake stroke fuel injection in which fuel injection is performed during an intake stroke so as to form a homogeneous mixture the cylinder, and a compression stroke fuel injection in which fuel injection is performed during a compression stroke so as to form a mixture layer having a low air-fuel ratio in the homogeneous mixture; and fuel injection amount correcting means for correcting an amount of fuel to be injected by the intake stroke fuel injection and an amount of fuel to be injected by the compression stroke fuel injection in accordance with the amount of the fuel vapor detected by the fuel vapor detecting means, so that an engine operation air-fuel ratio is maintained regardless of the amount of the fuel vapor, wherein the fuel injection amount correcting means reduces only the amount of fuel to be injected by the intake stroke fuel injection if the amount of the fuel vapor detected by the fuel vapor detecting means is less than the amount of fuel to be injected by the intake stroke fuel injection.

7. A fuel injection control apparatus according to claim 6, wherein if the amount of the fuel vapor detected by the fuel vapor detecting means is greater than the amount of fuel to be injected by the intake stroke fuel injection, the fuel injection amount correcting means suspends the intake stroke fuel injection, and reduces the amount of fuel to be injected by the compression stroke fuel injection.

8. A fuel injection control apparatus according to claim 6, wherein if the amount of the fuel vapor detected by the fuel vapor detecting means is greater than the amount of fuel to be injected by the intake stroke fuel injection, the fuel injection amount correcting means executes the intake stroke fuel injection by setting the amount of fuel to be injected by the intake stroke fuel injection to a predetermined amount, and reduces the amount of fuel to be injected by the compression stroke fuel injection.

9. A fuel injection control method of a direct fuel injection type spark ignition engine, comprising:

supplying a fuel vapor from a fuel tank into an engine intake passage;

detecting an amount of the fuel vapor in an engine intake air;

setting an amount of fuel injection from a direct fuel injection valve, a starting timing of the fuel injection and an ending timing of the fuel injection based on a state of operation of the engine;

changing both the starting timing and the ending timing of the fuel injection from the direct fuel injection valve in accordance with the amount of the fuel vapor detected; and injecting fuel directly into a cylinder of the engine based on the starting timing and the ending timing of the fuel injection that have been changed.

10. A fuel injection control method according to claim 9, wherein the fuel injection is performed in a homogeneous combustion mode in which fuel injection from the fuel injection valve is performed during an intake stroke so as to form a homogeneous mixture in the cylinder.

11. A fuel injection control method according to claim 9, wherein the fuel injection is performed in a weak stratified charge combustion mode of executing the fuel injection from the fuel injection valve during an intake stroke so as to form a homogeneous mixture in the cylinder, and by executing fuel injection during a compression stroke so as to form a mixture layer that has a low air-fuel ratio in the homogeneous mixture.

12. A fuel injection control method according to claim 9, wherein the fuel injection is performed by executing fuel injection in a stratified charge combustion mode in which fuel injection from the fuel injection valve is performed during a compression stroke so as to form a combustible mixture layer in an air in the cylinder.

13. A fuel injection control method according to claim 9, wherein in accordance with the state of operation of the engine, the fuel injection is performed by selecting one of:
- a homogeneous combustion mode fuel injection in which fuel injection from the fuel injection valve is performed during an intake stroke so as to form a homogeneous mixture in the cylinder;
- a weak stratified charge combustion mode fuel injection in which fuel injection from the fuel injection valve is performed during the intake stroke so as to form a homogeneous mixture in the cylinder, and in which fuel injection is performed during a compression stroke so as to form a mixture layer having a low air-fuel ratio in the homogeneous mixture; and
- a stratified charge combustion mode fuel injection in which fuel injection from the fuel injection valve is performed during the compression stroke so as to form a combustible mixture layer in an air of the cylinder.

14. A fuel injection control method of a direct fuel injection type spark ignition engine, comprising:
- supplying a fuel vapor from a fuel tank into an engine intake passage;
- detecting an amount of the fuel vapor in an engine intake air;
- setting an amount of fuel injection from a direct fuel injection valve based on a state of operation of the engine;
- dividing the amount of fuel injection set for an intake stroke fuel injection in which fuel injection is performed during an intake stroke so as to form a homogeneous mixture in a cylinder of the engine, and a compression stroke fuel injection in which fuel injection is performed during a compression stroke so as to form a mixture layer having a low air-fuel ratio in the homogeneous mixture;
- correcting an amount of fuel to be injected by the intake stroke fuel injection and an amount of fuel to be injected by the compression stroke fuel injection in accordance with the amount of the fuel vapor detected, so that an engine operation air-fuel ratio is maintained regardless of the amount of the fuel vapor; and
- injecting fuel into the cylinder based on the amount of fuel to be injected by the intake stroke fuel injection and the amount of fuel to be injected by the compression stroke fuel injection that have been corrected,
- wherein if the amount of the fuel vapor detected is less than the amount of fuel to be injected by the intake stroke fuel injection, only the amount of fuel to be injected by the intake stroke fuel injection is reduced for a correction.

15. A fuel injection control method according to claim 14, wherein if the amount of the fuel vapor detected is greater than the amount of fuel to be injected by the intake stroke fuel injection, the amount of fuel injection is corrected by suspending the intake stroke fuel injection, and by reducing the amount of fuel to be injected by the compression stroke fuel injection.

16. A fuel injection control method according to claim 14, wherein if the amount of the fuel vapor detected is greater than the amount of fuel to be injected by the intake stroke fuel injection, the amount of fuel injection is corrected by performing the intake stroke fuel injection by setting the amount of fuel to be injected by the intake stroke fuel injection to a predetermined amount, and is corrected by reducing the amount of fuel to be injected by the compression stroke fuel injection.

17. A fuel injection control apparatus of a direct fuel injection type spark injection engine, comprising:
- a fuel vapor purge device that supplies a fuel vapor from a fuel tank into an engine intake passage;
- fuel vapor detector that detects an amount of the fuel vapor in an engine intake air;
- a direct fuel injection valve that injects fuel directly into a cylinder; and
- a controller that sets an amount of fuel injection from the direct fuel injection valve, a starting timing of the fuel injection and an ending timing of the fuel injection based on a state of operation of the engine, and changes both the starting timing and the ending timing of the fuel injection from the direct fuel injection valve in accordance with the amount of the fuel vapor detected by the fuel vapor detector.

18. A fuel injection control apparatus of a direct fuel injection type spark ignition engine, comprising:
- a fuel vapor purge device that supplies a fuel vapor from a fuel tank into an engine intake passage;
- fuel vapor detector that detects an amount of the fuel vapor in an engine intake air;
- a direct fuel injection valve that injects fuel directly into a cylinder; and
- a controller that sets an amount of fuel injection from the direct fuel injection valve based on a state of operation of the engine, executes a fuel injection in which the amount of fuel injection set is injected into the cylinder in a divided manner by an intake stroke fuel injection in which fuel injection is performed during an intake stroke so as to form a homogeneous mixture the cylinder, and a compression stroke fuel injection in which fuel injection is performed during a compression stroke so as to form a mixture layer having a low air-fuel ratio in the homogeneous mixture, and corrects an amount of fuel to be injected by the intake stroke fuel injection and an amount of fuel to be injected by the compression stroke fuel injection in accordance with the amount of the fuel vapor detected by the fuel vapor detector, so that an engine operation air-fuel ratio is maintained regardless of the amount of the fuel vapor,
- wherein the controller reduces only the amount of fuel to be injected by the intake stroke fuel injection if the amount of the fuel vapor detected by the fuel vapor detector is less than the amount of fuel to be injected by the intake stroke fuel injection.

* * * * *

UNITED STATES PATENT AND TRADEMARK OFFICE
CERTIFICATE OF CORRECTION

PATENT NO.   : 6,371,086 B1
DATED        : April 16, 2002
INVENTOR(S)  : T. Matsubara et al.

It is certified that error appears in the above-identified patent and that said Letters Patent is hereby corrected as shown below:

Column 15,
Lines 40 and 43, change "a" to -- $\alpha$ --.

Signed and Sealed this

Twenty-first Day of January, 2003

JAMES E. ROGAN
*Director of the United States Patent and Trademark Office*